United States Patent
Wu et al.

(10) Patent No.: US 9,307,453 B2
(45) Date of Patent: Apr. 5, 2016

(54) METHOD, DEVICE AND SYSTEM FOR PROCESSING REVERSE SINGLE RADIO VOICE CALL CONTINUITY

(71) Applicant: Huawei Technologies Co., Ltd., Shenzhen (CN)

(72) Inventors: Xiaobo Wu, Shanghai (CN); Xiaoying Xu, Shanghai (CN); Hai Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 13/740,046

(22) Filed: Jan. 11, 2013

(65) Prior Publication Data

US 2013/0128865 A1 May 23, 2013

Related U.S. Application Data

(63) Continuation of application No. PCT/CN2011/074977, filed on May 31, 2011.

(30) Foreign Application Priority Data

Aug. 30, 2010 (CN) .......................... 2010 1 0270425

(51) Int. Cl.
*H04W 4/00* (2009.01)
*H04W 36/00* (2009.01)
(52) U.S. Cl.
CPC .......... *H04W 36/00* (2013.01); *H04W 36/0022* (2013.01)
(58) Field of Classification Search
USPC .................................. 370/329, 331, 333, 338
See application file for complete search history.

(56) References Cited

U.S. PATENT DOCUMENTS

2009/0086674 A1   4/2009   Ejzak
2010/0040020 A1*  2/2010   Chen ................. H04W 36/0022
                                                                370/331

(Continued)

FOREIGN PATENT DOCUMENTS

CN          101370261 A        2/2009
CN          101472326 A        7/2009

(Continued)

OTHER PUBLICATIONS

Chinese Office Action received on Application No. 201010270425.6, mailed Jul. 2, 2013, 9 pages. (Partial Translation).

(Continued)

*Primary Examiner* — Zewdu A Beyen
(74) *Attorney, Agent, or Firm* — Slater & Matsil, L.L.P.

(57) ABSTRACT

The present invention provides a method, device, and system for processing reverse single radio voice call continuity. The method includes, before handing over a voice service from a CS domain network to a PS domain network, preconfiguring, in the PS domain network by a UE, information about resources needed for the voice service handover; and in the process of handing over, by the UE, the voice service from the CS domain network to the PS domain network, establishing a forwarding channel between a first network element of the PS domain and a second network element of the CS domain by using the preconfigured information about resources, where the forwarding channel is configured to forward voice service data between the UE and a peer UE after the UE accesses the PS domain network.

13 Claims, 12 Drawing Sheets

(56) References Cited

U.S. PATENT DOCUMENTS

| | | | |
|---|---|---|---|
| 2010/0054207 A1 | 3/2010 | Gupta et al. | |
| 2010/0077459 A1* | 3/2010 | Mahdi et al. | 726/4 |
| 2010/0260105 A1 | 10/2010 | Keller et al. | |
| 2011/0110326 A1 | 5/2011 | Rexhepi et al. | |
| 2011/0164564 A1* | 7/2011 | Vedrine et al. | 370/328 |

FOREIGN PATENT DOCUMENTS

| | | |
|---|---|---|
| CN | 101574007 A | 11/2009 |
| JP | 2011233987 A | 11/2011 |
| WO | WO 2009/071702 A1 | 6/2009 |
| WO | WO 2010/052343 A2 | 5/2010 |

OTHER PUBLICATIONS

International Search Report received in Patent Cooperation Treaty Application No. PCT/CN2011/074977, mailed Sep. 1, 2011, 13 pages.

$3^{rd}$ Generation Partnership Project; Technical Specification Group Services and System Aspects; Single Radio Voice Call Continuity (SRVCC); Stage 2 (Release 9), 3GPP TS 23.216 V9.4.0, Jun. 2010, 41 pages.

$3^{rd}$ Generation Partnership Project; Technical Specification Group Services and System Aspects; IP Multimedia Subsystem (IMS) Service Continuity; Stage 2 (Release 10), 3GPP TS 23.237 V10.2.0, Jun. 2010, 98 pages.

Ericsson, ST-Ericsson, "Solution proposal for rSRVCC based on media anchor in serving network," 3GPP TSG SA WG2, Kyoto, Japan, May 10-14, 2010, 6 pages.

Japanese Office Action received in Application No. 2013-515679 mailed Jan. 28, 2014, 5 pages. (Partial Translation).

3rd Generation Partnership Project; Technical Specificationi Group Services and System Aspects; Feasibility Study of Single Radio Voice Call Continuity (SRVCC) from UTRAN/GERAN to E-UTRAN/HSPA; Stage 2 (Release 10), 3GPP TR 23.885 V0.3.0, May 2010, 44 pages.

Extended European Search Report received in Application No. 11777270.7-1858, Applicant: Huawei Technologies Co., Ltd., mailed May 13, 2013, 9 pages.

Written Opinion of the International Searching Authority received in Application No. PCT/CN2011/074977, Applicant: Huawei Technologies Co., Ltd., et al., mailed Sep. 1, 2011, 4 pages.

* cited by examiner

METHOD, DEVICE AND SYSTEM FOR PROCESSING REVERSE SINGLE RADIO VOICE CALL CONTINUITY

This application is a continuation of International Application No. PCT/CN2011/074977, filed on May 31, 2011, which claims priority to Chinese Patent Application No. 201010270425.6, filed on Aug. 30, 2010, both of which are hereby incorporated by reference in their entirety.

TECHNICAL FIELD

Embodiments of the present invention relate to the field of communications technologies, and in particular to a method, device and system for processing reverse single radio voice call continuity.

BACKGROUND

A network of the 2nd generation mobile communications technology (2nd Generation, 2G) or 3rd generation mobile communications technology (3rd Generation, 3G for short) achieves comprehensive coverage after being deployed for many years. At the same time, with the development of the network technologies, some PS domain-only networks that only provide packet switches (Packet Switch, PS for short), for example, a Long Term Evolution (Long Term Evolution, LTE for short) network, gradually cover some urban areas and areas with high traffic in the initial stage of network construction. Therefore, these PS domain-only networks and the 2G/3G network coexist in a current communications network.

For different communications networks, a voice service has different bearing mechanisms. Specifically, in the 2G/3G network, a voice call supports a conversational-class service borne by a circuit switched (Circuit Switched, CS for short) domain; whereas in a PS domain network, a voice call supports a conversational-class service borne by a packet switched (Packet Switched, PS for short) domain, which is also referred to as a voice over Internet Protocol (Voice over Internet Protocol, VOIP for short) service, where quality of service is ensured by an IP multimedia subsystem (IP Multimedia Subsystem, IMS for short).

Compared with a CS domain network, the PS domain network is capable of providing a voice service with a higher rate and higher quality for a user and satisfying more data service requirements of the user. Therefore, to develop more voice users of the PS domain network, an operator usually sets a priority of the PS domain higher than that of the CS domain to enable a voice user to preferably camp on the PS domain network. In the situation that the CS domain network and the PS domain network coexist, when a user equipment (User Equipment, UE for short) initiates a voice call in the CS domain of the 2G or 3G network and then moves to an area that is also covered by the PS domain network, based on the requirement for higher quality of a voice service or considering the restriction of a high priority, the UE needs to hand over the voice call from the CS domain to the PS domain of the LTE/HSPA network, that is, performing a procedure for processing reverse single radio voice call continuity (Single Radio Voice Call Continuity, SRVCC for short). In the handover procedure, for the voice call, voice interruption delay caused by the handover cannot exceed 300 ms. Otherwise, user experience is poor.

The existing reverse SRVCC processing is generally implemented by using the following two solutions. The first solution is that when performing the reverse SRVCC processing, the UE enables the voice service to exit from the 2G/3G CS domain network first and then access the LTE network, and initiates an access transfer processing procedure. In this solution, for a network access procedure, the UE enables the voice service to access the LTE network quickly, which avoids large voice interruption delay and does not affect user experience of voice continuity. For the access transfer, however, duration varies according to different application scenarios and the shortest needed duration is highly greater than the needed minimum value 300 ms of interruption delay during the voice handover, which severely affects voice continuity during the reverse SRVCC handover and causes poor quality of service.

The second reverse SRVCC processing solution is that when performing the reverse SRVCC processing, the UE hands over, in the 2G/3G network, a bearer of the voice service from the CS domain to the PS domain first, that is, performing an access transfer in the 2G/3G network first, and then performs access to the LTE network to completely hand over the voice service to the PS domain of the LTE network. In this solution, although the service continuity of the voice service of the UE between the LTE PS domain network and the 2G/3G CS domain network can be ensured by using the transition of a PS domain voice service of the 2G/3G network, the PS domain voice service supported by a 2G/3G PS domain network is only capable of providing services of low quality for the UE, and therefore the user cannot enjoy a voice service with good quality for a long period of time.

SUMMARY OF THE INVENTION

Embodiments of the present invention provide a method, device and system for processing reverse single radio voice call continuity to resolve the defect of a failure in ensuring good voice continuity or of low quality of service in a voice handover procedure, which is caused by high interruption delay during the voice handover in the existing reverse SRVCC technology.

An embodiment of the present invention provides a method for processing reverse single radio voice call continuity, including, before handing over a voice service from a circuit switched domain network to a packet switched domain network, preconfiguring, in the packet switched domain network and by a user equipment, information about resources needed for the voice service handover; and in the process of handing over, by the user equipment, the voice service from the circuit switched domain network to the packet switched domain network, establishing a forwarding channel between a first network element of the packet switched domain network and a second network element of the circuit switched domain network by using the preconfigured information about resources, where the forwarding channel is configured to forward voice service data between the user equipment and a peer user equipment after the user equipment accesses the packet switched domain network.

An embodiment of the present invention further provides a user equipment, including a resource information configuring module, configured to: before the user equipment hands over a voice service from a circuit switched domain network to a packet switched domain network, preconfigure, in the packet switched domain network, information about resources needed for the voice service handover so that in the process of handing over, by the user equipment, the voice service from the circuit switched domain network to the packet switched domain network, a forwarding channel is established between a first network element of the packet switched domain network and a second network element of the circuit switched domain network by using the preconfigured information about resources, where the forwarding channel is configured to forward voice service data between the user equipment and a peer user equipment after the user equipment accesses the packet switched domain network.

An embodiment of the present invention further provides a mobility management entity, including a receiving module, configured to receive a handover request, where the handover request is used to request a handover of a voice service of a user equipment from a circuit switched domain network to a packet switched domain network and a forwarding channel establishing module, configured to: in the process of handing over, by the user equipment, the voice service from the circuit switched domain network to the packet switched domain network, control establishment of a forwarding channel between a first network element of the packet switched domain network and a second network element of the circuit switched domain network according to the handover request and by using information about resources needed for the voice service handover that is preconfigured by the user equipment in the packet switched domain network, where the forwarding channel is configured to forward voice service data between the user equipment and a peer user equipment after the user equipment accesses the packet switched domain network.

An embodiment of the present invention provides a system for processing reverse single radio voice call continuity, including a user equipment, a first network element, and a second network element, where the user equipment is configured to: before handing over a voice service from a circuit switched domain network to a packet switched domain network, preconfigure, in the packet switched domain network, information about resources needed for the voice service handover, and the first network element is located in the packet switched domain network, the second network element is located in the circuit switched domain network, and in the process of handing over, by the user equipment, the voice service from the circuit switched domain network to the packet switched domain network, a forwarding channel is established between the first network element of the packet switched domain network and the second network element of the circuit switched domain network by using the preconfigured information about resources, where the forwarding channel is configured to forward voice service data between the user equipment and a peer user equipment after the user equipment accesses the packet switched domain network.

According to the method, device, and system for processing reverse single radio voice call continuity in the embodiments of the present invention, before a UE hands over a voice service from a CS domain network to a PS domain network, the UE preconfigures, in the PS domain network, information about bearer resources needed for the voice handover. In the process of handing over, by the UE, the voice service from the CS domain network to the PS domain network, a forwarding channel of voice data is established between the CS domain network and the PS domain network by using information about a reserved bearer, in which the information is preallocated by the PS domain network for the UE. In this manner, after the UE actually initiates the voice service handover from the CS domain network to the PS domain network and quickly accesses the PS domain network, the UE is capable of quickly transmitting voice data with a peer user equipment through the established forwarding channel without the need of waiting a long time before an access transfer procedure is completed. This ensures good performance of voice service continuity in the reverse SRVCC handover procedure. Further, the forwarding channel is established on the basis that the UE completes the access to the PS domain network. Therefore, the voice service performed based on the forwarding channel is further capable of achieving good quality of the voice service.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

In order to make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons skilled in the art based on the embodiments of the present invention without creative effects shall fall within the protection scope of the present invention.

Figure 1:
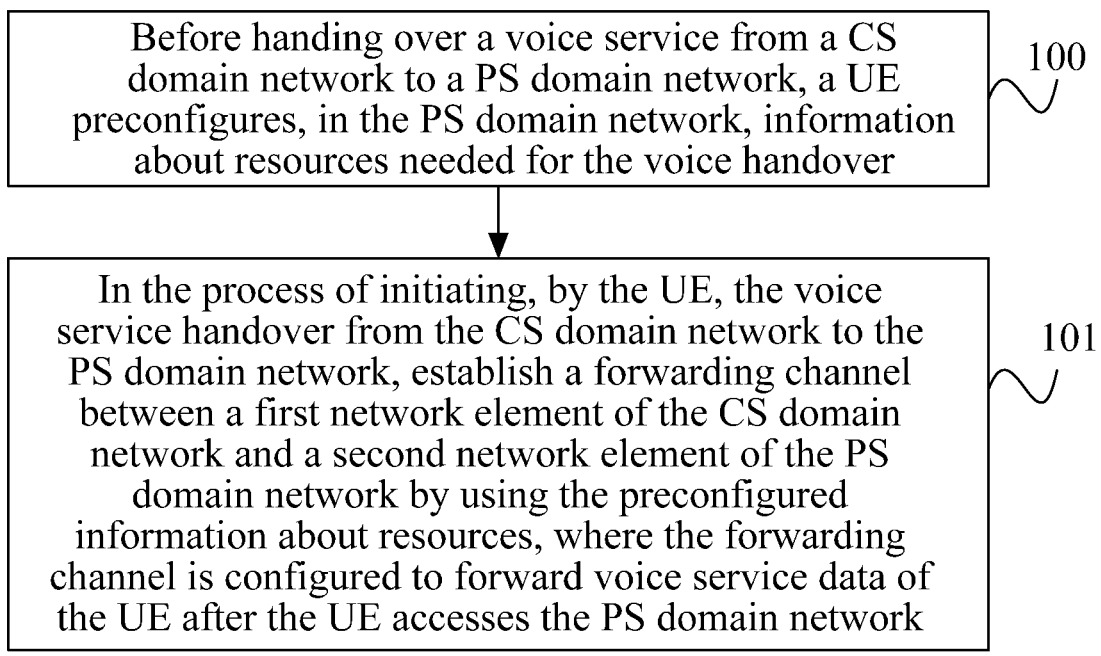
FIG. 1 is a flow chart of a method for processing reverse single radio voice call continuity according to Embodiment 1 of the present invention.

FIG. 1 is a flow chart of a method for processing reverse single radio voice call continuity according to Embodiment 1 of the present invention. As shown in FIG. 1, the method includes the following steps.

Step 100: Before handing over a voice service from a CS domain network to a PS domain network, a UE preconfigures, in the PS domain network, information about resources needed for the voice service handover.

In the reverse SRVCC processing solution in this embodiment, before the UE initiates the voice service handover from the CS domain network to the PS domain network, in order to preconfigure, in the PS domain network, information about resources for handing over a bearer of the voice service to the PS domain network so that after a reverse SRVCC handover process is actually initiated, a core network element in the PS domain network is capable of quickly establishing a new voice bearer channel between the UE and a peer user equipment by using preallocated bearer resources, the UE completes in advance, in the PS domain network, its configuration on the user media layer in the core network element of the PS domain network before initiating the voice service handover. In this manner, information about certain resources for transmitting voice data packets is preconfigured in the PS domain network.

Specifically, the preparation process occurs before the UE initiates the reverse SRVCC handover of the voice service. The UE completes in advance, in the PS domain network, for example, an LTE network, the configuration on the user media layer so that the core network element of the PS domain network is capable of preallocating, for the UE, information about resources needed for bearing a VOIP voice service in the PS domain network, for example, an IP address, a number, and a codec that are needed by the UE to bear the voice service in the PS domain network. In this manner, when the UE actually initiates an access transfer for the voice service, a control network element is capable of quickly establishing a new voice bearer channel between the UE and the peer user equipment by using the preallocated information about resources to ensure continuity of the voice service of the UE in a handover process.

Step 101: In the process of initiating, by the UE, the voice service handover from the CS domain network to the PS domain network, establish a forwarding channel between a first network element of the PS domain network and a second network element of the CS domain network by using the preconfigured information about resources, where the forwarding channel is configured to forward voice service data of the UE after the UE accesses the PS domain network.

In the process of actually initiating, by the UE, the voice service handover from the CS domain to the PS domain, before the UE performs the reverse SRVCC handover, the PS domain network has preallocated, for the UE, information about resources for bearing a related service of the UE in the PS domain network, and therefore in the handover process, the PS domain network may quickly establish, by using the preconfigured information about resources, a new data forwarding channel between the UE and the peer user equipment for exchanging voice data.

Specifically, for the purpose of eliminating the impact of a long duration, which is needed for the access transfer in the reverse SRVCC handover process, on interruption delay of the voice handover service to quickly establish a voice data forwarding channel between the UE and the peer user equipment, in this embodiment, after the UE initiates a reverse SRVCC service handover procedure, a forwarding channel is established between the first network element in the PS domain network and the second network element in the CS domain network by using information about reserved resources preallocated by the PS domain network for the UE in the pre-registration process performed by the UE. The forwarding channel is configured to forward voice data exchanged between the UE and a peer UE after the UE accesses the PS domain network, specifically, accesses an evolved NodeB (Evolved Node B, ENB for short) of the PS domain network and before the UE performs an access transfer procedure, which is equal to providing a new path for the UE and the peer UE to perform a voice session.

The PS domain network has preallocated, for the UE, the information about resources for bearing a service of the UE in the PS domain. Based on the preconfigured information about resources, the forwarding channel between the first network element and the second network element can be quickly established without depending on completion of the access transfer process in the reverse SRVCC handover procedure performed by the UE. At the same time, in regard to the UE, in the reverse SRVCC handover procedure, the UE is further capable of quickly completing an access operation in the PS domain network to access the ENB of the PS domain network. Therefore, in this embodiment, after the UE initiates the reverse SRVCC handover for the voice service, once the UE successfully accesses the PS domain network, the UE may immediately perform voice data exchange with the peer UE through the forwarding channel without the need of waiting a long time for the completion of the access transfer procedure. In this manner, an MME may quickly hand over, in the PS domain network environment, the voice service of the UE to a VOIP bearer of the PS domain network in a short period of time so that the UE quickly establishes voice communication with the peer user equipment. In this manner, the interruption delay during the reverse SRVCC voice handover in this embodiment is not affected even when the completion of the access transfer needs a long duration, thereby ensuring good voice continuity of the voice service in the handover process.

Further, a new forwarding channel is established on the basis that the UE completes the access to the PS domain network. Therefore, the voice service of the UE based on the forwarding channel belongs to the VOIP voice service class of the PS domain network. In this case, compared with the transition solution of the PS domain voice service of the 2G/3G network in the prior art, the forwarding channel is also capable of ensuring that the voice service of the UE achieves good quality of service in the handover process.

According to the method for processing reverse single radio voice call continuity in this embodiment, before a UE hands over a voice service from a CS domain network to a PS domain network, the UE preconfigures, in the PS domain network, information about bearer resources needed for completing the voice service handover. In the process of handing over, by the UE, the voice service from the CS domain network to the PS domain network, a forwarding channel of voice data is established between the CS domain network and the PS domain network by using information about a reserved bearer, in which the information is preallocated by the PS domain network for the UE. In this manner, after the UE actually initiates the voice service handover from the CS domain network to the PS domain network and quickly accesses the PS domain network, the UE is capable of quickly transmitting voice data with a peer user equipment through the established forwarding channel without the need of waiting a long time for the completion of an access transfer procedure. This ensures good performance of voice service continuity in the reverse SRVCC handover process. Further, the forwarding channel is established on the basis that the UE completes the access to the PS domain network. Therefore, the voice service performed based on the forwarding channel is further capable of achieving good quality of the voice service.

Figure 2:
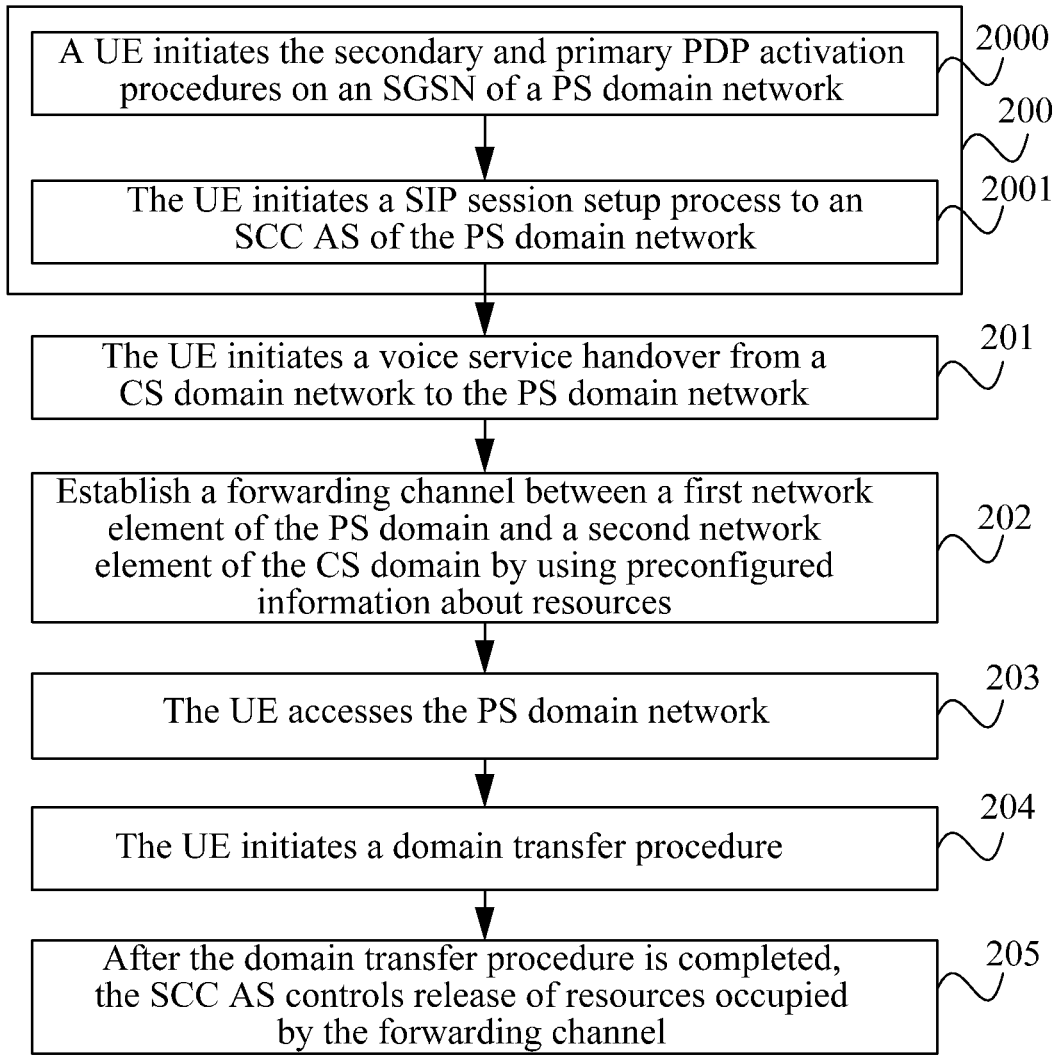
FIG. 2 is a flow chart of a method for processing reverse single radio voice call continuity according to Embodiment 2 of the present invention.

FIG. 2 is a flow chart of a method for processing reverse single radio voice call continuity according to a second embodiment of the present invention. As shown in FIG. 2, the method includes the following steps.

Step 200: Before handing over a voice service from a CS domain network to a PS domain network, a UE performs IMS registration and sets up a Session Initiation Protocol (Session Initiation Protocol, SIP for short) session in the PS domain network to preconfigure information about resources in the PS domain network.

In this embodiment, the preconfiguring, by the UE, the information about resources in the PS domain network before handing over the voice service from the CS domain network to the PS domain network may specifically be implemented by using the procedure in which the UE performs IMS registration and sets up a SIP session in the PS domain network. Specifically, the process of preconfiguring the information about resources may include the following substeps.

Step 2000: The UE initiates an attach procedure and a primary Packet Data Protocol (Packet Data Protocol, PDP for short) activation procedure on a serving GPRS support node (Serving GPRS Support Node, SGSN for short) of the PS domain network.

Before handing over the voice service from the CS domain network to the PS domain network, the UE may complete registration in the PS domain network in advance according to a registration procedure stipulated in the protocol. Specifically, the UE may sequentially initiates and completes the attach (Attach) procedure and the primary PDP activation procedure on an SGSN device of the PS domain network according to procedures stipulated in the protocol. By using the attach procedure and the primary PDP activation procedure, the UE may negotiate, with the SGSN, information needed by the UE to initiate a voice call in the PS domain network, for example, voice codec (CodeC) information of the UE in the PS domain network and information about a session transfer number for SRVCC (Session Transfer Number for Single Radio Voice Call Continuity, STN-SR for short), and enable the PS domain network to allocate needed resources for the UE. Specifically, in regard to the CodeC information, in the attach procedure initiated by the UE, the UE may carry, in an attach request sent to the SGSN, CodeC information that is supported by default in the PS domain network. Based on the CodeC information, the SGSN may learn the corresponding codec type of the UE in the PS domain.

Alternatively, after the primary PDP activation procedure, the UE may further initiates a secondary PDP activation procedure to the SGSN, where the secondary PDP activation procedure assists the primary PDP activation procedure. In the secondary PDP activation procedure, the UE may specify, to the SGSN, the class of service of the UE in the current PS domain network registration, for example, specifying that the current registration procedure is specifically used for the voice service.

Step 2001: The UE initiates a SIP session setup process to a service centralization and continuity application server (Service Centralization and Continuity Application Server, SCC AS for short) of the PS domain network.

After the UE completes the PS domain registration on the SGSN, the UE may further initiate a SIP session setup request to the SCC AS and pre-establish a reserved SIP session connection in the PS domain network by initiating the process of setting up a SIP session with the SCC AS. Specifically, the initiating, by the UE, the SIP session setup request does not aim to actually set up a SIP session with a peer UE. Actually, the pre-established SIP session connection may not actually function before the UE initiates a voice service handover from the CS domain network to the PS domain network, and may be used only for allocating corresponding resources for the UE in a core network of the PS domain network and does not transmit any data. Even in the SIP session setup process, the SCC AS does not need to initiate an actual call to the peer UE. However, once the UE initiates the reverse SRVCC handover process of the voice service, in the reverse SRVCC handover process, the UE may quickly hand over the voice service to VOIP voice of the PS domain based on the preallocated resources and perform a subsequent access transfer procedure for the voice service. In this manner, a SIP session does not need to be initiated temporarily in the subsequent access transfer procedure, which is equal to accelerating the subsequent access transfer procedure.

Specifically, the UE may carry special reverse SRVCC indication information in the SIP session setup request sent to the SCC AS, where the reverse SRVCC indication information is used to indicate to the SCC AS that the SIP session set up currently is used in a subsequent reverse SRVCC handover procedure, thereby indicating that the SCC AS does not need to initiate an actual call to the peer UE when setting up the SIP session for the UE according to the SIP session setup request. Further, in this embodiment, before the UE performs the reverse SRVCC handover, both the SIP session set up in advance for the UE in the PS domain network and the information about resources preconfigured by the UE are not used to actually transmit voice data. For any voice bearer path, if no data packet is transmitted for a long period of time, as stipulated by the protocol layer, a corresponding core network element may release information about resources belonging to the bearer. Therefore, in this embodiment, to prevent this situation from occurring, the reverse SRVCC indication information, which is carried by the UE in the SIP session setup request sent to the SCC AS, may further be used to indicate that the SCC AS does not need to proactively trigger the process of releasing the information about resources of the UE even when no data is transmitted on the reserved SIP session connection for a long period of time.

In an actual application, the carrying, by the UE, the reverse SRVCC indication information in the SIP session setup request sent to the SCC AS may specifically be implemented in the following two manners: the UE may separately carry a piece of indication information in the SIP session setup request, for example, rSRVCC indicator information, where the rSRVCC indicator information indicates to the SCC AS that the established SIP session is actually used in a subsequent reverse SRVCC handover; or the UE may also carry a special called number in the SIP session setup request sent to the SCC AS, where the special called number may be a particular number for the reverse SRVCC handover. When receiving the SIP session setup request that carries a similar called number, the SCC AS may also learn that the SIP session is used in the reverse SRVCC handover, and therefore may only negotiate, in the SIP session setup process, allocation of information about needed bearer resources with the UE rather than actually initiate a voice call to the peer UE.

Further, alternatively, in the process of performing, by the UE, the IMS registration in the PS domain network and setting up the SIP session connection of the PS domain network, the UE may further send another piece of indication information to the SGSN besides sending the reverse SRVCC indication information to the SCC AS. The indication information is used to indicate that the SGSN does not need to initiate a radio access bearer (Radio Access Bearer, RAB for short) establishment process after the SIP session is set up in the PS domain network for the UE. The UE sends the indication information to indicate that the SGSN does not need to initiate the RAB establishment process because before the reverse SRVCC handover, the actual function of establishing the SIP session connection for the UE is preparing for the subsequent reverse SRVCC handover process. Before the reverse SRVCC handover process is performed, the SIP session connection does not transmit any voice data of the UE. Therefore, accordingly, the SGSN does not need to initiate an actual RAB establishment process, thereby avoiding a waste of resources.

Specifically, the UE may send the indication information to the SGSN according to the following methods. If the SGSN supports Gn/Gp mode, the UE may set a corresponding identifier bit, for example, setting a field of the maximum bite rate (Maximum Bit Rate, MBR for short) to 0, when sending a primary PDP activation request to the SGSN in the primary PDP activation process in step 2000, so as to notify the SGSN that the RAB establishment process does not need to be initiated. In addition, the UE may also carry the indication information in the primary PDP activation request sent to the SGSN, so as to indicate to the SGSN that the VOIP voice bearer is reserved for the reverse SRVCC handover, thereby indicating that the SGSN does not need to initiate the RAB establishment process. In addition, the UE may also not add any special indication. After the SGSN receives the primary PDP activation request sent by the UE, if the network does not support the capability of establishing a PS domain voice service, the SGSN also does not trigger the RAB establishment process. If the SGSN supports S4 mode, when sending the primary PDP activation request to the SGSN, the UE may set the Traffic Class parameter to a conversational class among parameters of quality of service (Quality of Service, QoS for short) that are carried in the request, so as to notify the SGSN that the RAB establishment process does not need to be triggered.

In addition, it should further be noted that if the UE does not report its supported CodeC information in the PS domain network to the SGSN during the procedure for attaching to the SGSN, alternatively, in the signaling interaction process of setting up the SIP session by the UE and the SCC AS in this step, the UE may further negotiate, with the SCC AS, the CodeC information of the UE in the PS domain network. After negotiation is successful, the SCC AS carries negotiated CodeC information in a SIP response message and returns the SIP response message to the UE. In addition, information identifying, for example, a destination IP address of service sending of the UE in the PS domain network may also be negotiated by the UE and the SCC AS in the signaling interaction process, and negotiated IP address information is carried by the SCC AS in the SIP response message and returned to the UE together with the CodeC information. By using the registration process performed by the UE in the PS domain network in step 200, the PS domain network preallocates, for the UE, information about reserved resources for the UE to transmit voice data in the PS domain network. Specifically, the information about reserved resources includes information such as an STN-SR number, an IP address, or CodeC information of the UE in the PS domain network. Further, the information about reserved resources should also include at least first information that is allocated by a first network element of the PS domain network, for example, an access transfer gateway (Access Transfer Gateway, ATGW for short) or a packet data network gateway (Packet Data Network Gateway, PGW for short), to the UE for the reverse SRVCC handover.

The first information may specifically include information such as an IP address and/or a port allocated by the first network element for the UE. Other network elements in the network are capable of identifying the first network element based on the first information, thereby establishing a data forwarding channel with the first network element. It should be noted that the information about the port preallocated by the first network element may specifically be: in the first network element, the information about a port reserved in advance for the reverse SRVCC handover, that is, the first network element may specify in advance a particular port for the reverse SRVCC handover process. Therefore, when the first network element allocates the first information for the UE, the first network element does not need to allocate a port for the UE temporarily, and instead may allocate, to the UE, the information about the port specified in advance. At the same time, it should further be noted that, in the actual application, the ATGW is generally deployed together with an access transfer control functionality (Access Transfer Control Functionality, ATCF for short). Therefore, in this embodiment, when the first network element is subsequently referred to as the ATGW, the first network element is referred to as the ATCF/ATGW instead, indicating that all signaling messages sent by other network elements to the ATGW may be forwarded by the ATCF to the ATGW.

Specifically, if the first network element is the PGW, in the primary PDP activation procedure that is initiated to the SGSN in step 2000, the UE may instruct the SGSN to acquire the first information from the PGW; or if the UE further sends a secondary PDP activation request to the SGSN after initiating the primary PDP activation procedure to the SGSN, in the secondary PDP activation procedure, the UE may also instruct the SGSN to acquire the first information from the PGW. If the first network element is the ATCF/ATGW, the UE may anchor the IMS registration to an ATCF device during the IMS registration process in the PS domain and anchor the user plane of the SIP session to the ATGW during the process of setting up the SIP session with the SCC AS so that the ATCF/ATGW allocates information about corresponding bearer resources in the PS domain network for the UE, that is, allocating the first information.

In this embodiment, it should further be noted that after the UE completes the IMS registration in the PS domain and initiates the SIP session setup to the SCC AS, to further reduce handover delay caused in the reverse SRVCC handover process performed by the UE, alternatively, on this basis, the UE may further pre-establish, in the PS domain network, a reserved VOIP voice bearer with the SCC AS for bearing a VOIP voice service of the UE. That is, bearer information is further allocated in a core network element of the PS domain network to the UE for the VOIP voice service. The reserved VOIP voice bearer that is pre-established is also used in the subsequent reverse SRVCC handover process and is in suspended state before the handover. By pre-establishing the suspended VOIP voice bearer, the UE does not need to establish a VOIP voice bearer temporarily when the UE actually initiates the reverse SRVCC handover process, thereby further accelerating the voice service handover to the PS domain network.

At the same time, it should be noted that the reserved VOIP voice bearer is established for the UE after the SIP session connection is established between the UE and the SCC AS and before the reverse SRVCC handover process, and besides, in this embodiment, if the first network element of a bearer network in the PS domain is the ATCF/ATGW, the VOIP voice bearer establishment process may also be triggered by a core network element in the PS domain network after the UE initiates a reverse SRVCC handover request and in the reverse SRVCC handover process. Specifically, the VOIP voice bearer establishment process may be triggered by the SGSN, a mobile switching center (Mobile Switching Center, MSC for short), the ATCF, or another core network element in the PS domain network immediately after the UE initiates the reverse SRVCC handover request. Compared with the solution in which the reserved VOIP voice bearer is established before the reverse SRVCC handover process, in this solution, although the VOIP voice bearer is established in the reverse SRVCC handover process, the situation that related voice resources need to be reserved in the PS domain network before the reverse SRVCC handover is avoided, thereby avoiding a waste of resources in the PS domain network.

In addition, it should further be noted that for the voice service, the UE may be classified into two types: a type supporting dual transfer mode (Dual Transfer Mode, DTM for short) or Universal Mobile Telecommunications System (Universal Mobile Telecommunications System, UMTS for short) mode, and a type not supporting DTM mode or UMTS mode. If the UE supports DTM or UMTS mode, the voice service and a data service of the UE may be borne in the CS domain and the PS domain respectively at the same time. Therefore, before the UE performs the reverse SRVCC handover, the UE may perform the IMS registration of the PS domain network after setting up a voice session of the CS domain with the peer UE. A new IMS registration procedure does not affect the voice service of the UE in an original CS domain network. If the UE does not support DTM or UMTS mode, the voice service and the data service of the UE cannot be borne in the CS domain and the PS domain at the same time. Therefore, before the UE performs the reverse SRVCC handover, the IMS registration and SIP session setup that are performed by the UE in the PS domain network need to be completed before the UE sets up the voice session of the CS domain in the CS domain network. That is, needed resources are allocated in the PS domain network for the UE first, and then the UE sets up a normal voice session in the CS domain network to bear the voice service in the CS domain network, thereby avoiding the situation that the IMS registration and the SIP session set up affect the voice service in the original CS domain network.

Step 201: The UE initiates the voice service handover from the CS domain network to the PS domain network.

Step 202: Establish a forwarding channel between the first network element of the PS domain and a second network element of the CS domain by using the preconfigured information about resources.

Step 203: The UE accesses the PS domain network.

After the UE completes the IMS registration and SIP session setup processes in the PS domain network and enables the PS domain network to preallocate, for the UE before the handover, the information about resources needed for bearing and transmitting voice data, in the process of actually handing over, by the UE, the voice service from the CS domain network to the PS domain network, the first network element of the PS domain and the second network element of the CS domain may successfully establish, on the premise that the UE does not perform access transfer or the access transfer procedure is not completed, a forwarding channel between thereof by using the information about resources preallocated by the PS domain network for the UE and the SIP session set up in advance. In this manner, after the ENB in the PS domain network allocates access handover resources for the UE according to a handover request and the UE successfully accesses the PS domain network, the forwarding channel between the first network element and the second network element may be used to bear and transmit voice data between the UE and the peer UE after the UE accesses the PS domain network and before the access transfer operation is performed or the access transfer procedure is completed.

Specifically, the second network element of the CS domain network may specifically be an MSC supporting the reverse SRVCC service (rSRVCC MSC for short). Downlink voice data sent by the UE to the peer UE may be transmitted to the peer UE through the UE, the ENB, the first network element, the forwarding channel between the first network element and the second network element, and the second network element. Uplink voice data send by the peer UE to the UE may be transmitted to the UE through a reverse path. In this manner, the UE is capable of transmitting voice data with the peer UE through the newly established forwarding channel without depending on the access transfer procedure, thereby ensuring good continuity performance of a voice call in the handover process.

Specifically, in the reverse SRVCC handover process, the establishment of the forwarding channel between the first network element and the second network element may be controlled by a mobility management entity (Mobility Management Entity, MME for short). For example, if the first network element of the PS domain network is the PGW, in this embodiment, the specific process of controlling, by the MME, the establishment of the forwarding channel between the first network element of the PS domain and the second network element of the CS domain by using the preconfigured information about resources may be as follows.

In the pre-registration process of the UE, the first information, such as the IP address and/or port, allocated by the first network element to the UE has been acquired and stored by the SGSN. Therefore, in the current reverse SRVCC handover process, the MME may acquire the first information from the SGSN. Further, to enable the second network element of the CS domain network to establish, with the first network element, the forwarding channel for transmitting voice data, the MME further forwards the acquired first information to the second network element, which is equal to notifying the second network element of the information such as the IP address and/or port of the first network element. In this manner, when receiving uplink voice data sent by the peer UE to the UE, the second network element may transmit the uplink voice data to the first network element according to the information so as to transmit the uplink voice data to the UE.

Further, to enable the first network element to know information such as the IP address and/or port of the second network element so that when receiving downlink voice data sent by the UE to the peer end, the first network element is capable of transmitting the downlink voice data to a corresponding second network element according to the acquired related information of the second network element, thereby transmitting the downlink voice data to the peer UE, the MME further acquires, from the second network element of the CS domain, that is, from rSRVCC MSC, second information allocated by the rSRVCC MSC to the forwarding channel. Likewise, the second information includes information such as the IP address and/or port allocated by the rSRVCC MSC to the UE. After acquiring the second information from the second network element, the MME forwards the second information to the first network element. In this manner, when receiving downlink voice data sent by the UE to the peer UE, the first network element may transmit the downlink voice data to the second network element according to the IP address and/or port information of the second network element.

It should be noted that at the same time of forwarding, to the second network element, the IP address and/or port information allocated by the first network element, the MME may further forward, to the second network element, context information, for example, corresponding CodeC information and STN-SR information of the UE in the PS domain network, which is registered by the UE in the registration process, so that the second network element rSRVCC MSC is capable of performing, according to the CodeC information, a corresponding encoding operation on the received uplink voice data sent by the peer UE and a corresponding encoding operation on the downlink voice data sent by the UE, and then performing transmission between the UE and the peer UE.

If the first network element in the PS domain network is the ATCF/ATGW, in this embodiment, the process of controlling, by the MME, the establishment of the forwarding channel between the ATCF/ATGW and the rSRVCC MSC may be as follows: after receiving the handover request forwarded by the rSRVCC MSC, the MME may first acquire, from the SGSN device, the STN-SR information pre-registered in the PS domain network by the UE and forward the STN-SR information to the second network element in the CS domain network, that is, to the rSRVCC MSC; after learning the STN-SR information pre-registered in the PS domain network by the UE, the rSRVCC MSC is capable of accurately addressing to the ATCF device to which the UE anchors a registration request in the pre-registration process so that the rSRVCC MSC sends the second information of the allocated IP address and/or port to the user plane entity ATGW of the first network element in the PS domain network through the ATCF device; further, after learning the IP address and/or port information of the rSRVCC MSC, the user plane entity ATGW of the first network element is also capable of accurately sending the first piece of information of the IP address and/or port preallocated for the UE to the rSRVCC MSC. In this manner, after the first network element and the second network element exchange respective IP address and/or port information, a forwarding channel is successfully established between the first network element and the second network element.

It should be noted that, in the preceding process, if the UE supports DTM or UTMS mode, the step of acquiring, by the MME from the SGSN device, the STN-SR information pre-registered in the PS domain network by the UE may be implemented by proactively sending, by the SGSN, the STN-SR information to the MME, in which the STN-SR information is included in and sent together with the handover request forwarded to the MME, after receiving the handover request. If the UE does not support DTM or UTMS mode, the SGSN does not receive the handover request, and the step of acquiring, by the MME from the SGSN device, the STN-SR information pre-registered in the PS domain network by the UE may be implemented by sending, by the MME, an identifier query request, for example, sending a location update request message, to an HSS to query, according to the identifier of the UE, for an SGSN corresponding to the UE in the HSS and acquiring, from the SGSN, the context information that is pre-registered by the UE and includes the STN-SR information.

In addition, it should further be noted that if the first network element in the PS domain network is the ATCF/ATGW, in this embodiment, the process of establishing the forwarding channel between the ATCF/ATGW and the rSRVCC MSC by using the preconfigured information about resources may not be controlled by the MME. Specifically, the process is as follows: after receiving the handover request, the rSRVCC MSC may directly send the identifier query request carrying the identifier of the UE, for example, the location update request message, to the HSS to query the HSS for the identifier of the SGSN corresponding to the UE; after finding the identifier of the SGSN, the rSRVCC MSC may directly forward the handover request to a specified SGSN and acquire, from the SGSN by using the handover request, the context information pre-registered by the UE. In this case, the SGSN may further forward the handover request to the MME to trigger a bearer preparation process at a target side. At the same time, the rSRVCC MSC may directly address, according to the acquired STN-SR information of the UE, to the ATCF device to which the UE anchors the registration request in the pre-registration process, and establish the forwarding channel with the first network element ATGW through the ATCF device.

It may be seen from the preceding description that in the reverse SRVCC handover process performed by the UE, the forwarding channel between the first network element and the second network element may be established in various manners. In the following embodiments, the various implementation manners are described in detail respectively.

In addition, it should further be noted that, in this embodiment, in the reverse SRVCC handover process performed by the UE, the process of accessing, by the UE, the PS domain network and the process of establishing the forwarding channel between the first network element and the second network element may be performed at the same time. Specifically, the ENB of the PS domain network may allocate access resources for the UE at the same time of the process of establishing the forwarding channel. The processing speed of the UE in the network access procedure is very fast. Therefore, before the forwarding channel is established, the UE is generally capable of successfully accessing the PS domain network. In this manner, once the forwarding channel is established, the UE may perform voice data communication with the peer UE through the ENB of the PS domain network, the first network element, the forwarding channel between the first network element and the second network element, and a communication link of the second network element, which is equal to completing the handover in the PS domain network. Compared with the access transfer procedure, the process of establishing the forwarding channel needs only a short period of time. Therefore, in this embodiment, the UE may quickly hand over the voice service to the PS domain network and the completion of the handover does not depend on the access transfer procedure. This ensures good voice service continuity performance in the reverse SRVCC handover process. Further, the forwarding channel is established on the basis that the UE completes the access to the PS domain network. Therefore, the voice service performed by the UE based on the forwarding channel is further capable of achieving good quality of the voice service.

For the peer UE, it should be noted that although the UE has accessed the PS domain network and has borne its voice service in the PS domain network, the peer UE still performs voice data exchange with the UE through the second network element of the CS domain, that is, through the MGW, and therefore the peer UE cannot learn the fact that the UE has handed over the voice service to the PS domain network and considers that it performs voice data communication with the UE still in the CS domain network. However, this does not affect the quality of the voice service between the two parties, and therefore does not bring any other problems.

Step 204: The UE initiates the access transfer procedure.

Step 205: After the access transfer procedure is completed, the SCC AS controls release of resources occupied by the forwarding channel.

After the forwarding channel is established and the UE is already capable of performing voice data communication with the peer UE through the forwarding channel and using the pre-established reserved VOIP voice bearer, in this embodiment, to actually hand over the voice service between the UE and the peer UE to the PS domain network, alternatively, the UE may further initiate the access transfer procedure on this basis. The access transfer procedure is performed on the basis that the UE is capable of performing a normal VOIP voice service with the peer UE. Therefore, the speed of the access transfer procedure does not cause interruption of the voice service of the UE.

After the access transfer procedure is completed, the UE does not need to transmit downlink voice data to the peer UE through the forwarding channel between the first network element and the second network element and also does not need to receive, through the forwarding channel, uplink voice data sent by the peer UE. Instead, the UE may directly perform voice data communication with the peer UE through the communication link from the ENB, a serving gateway (Serving Gateway, Serving GW for short), to the PGW. Therefore, in this situation, the SCC AS may control the release of the resources occupied by the forwarding channel to actually complete the reverse SRVCC handover procedure.

According to the method for processing reverse single radio voice call continuity in this embodiment, before a UE hands over a voice service from a CS domain network to a PS domain network, the UE performs IMS registration and initiates SIP session setup in advance in the PS domain network so that the PS domain network preallocates information about bearer resources for the UE. In the process of handing over, by the UE, the voice service from the CS domain network to the PS domain network, a forwarding channel of voice data is established between the CS domain network and the PS domain network by using information about a reserved bearer, in which the information is preallocated by the PS domain network for the UE. In this manner, after the UE actually initiates the voice service handover from the CS domain network to the PS domain network and quickly accesses the PS domain network, the UE is capable of quickly transmitting voice data with a peer user equipment through the established forwarding channel without the need of waiting a long time before an access transfer procedure is completed. This ensures good performance of voice service continuity in the reverse SRVCC handover procedure. Further, the forwarding channel is established on the basis that the UE completes the access to the PS domain network. Therefore, the voice service performed based on the forwarding channel is further capable of achieving good quality of the voice service.

Figure 3:
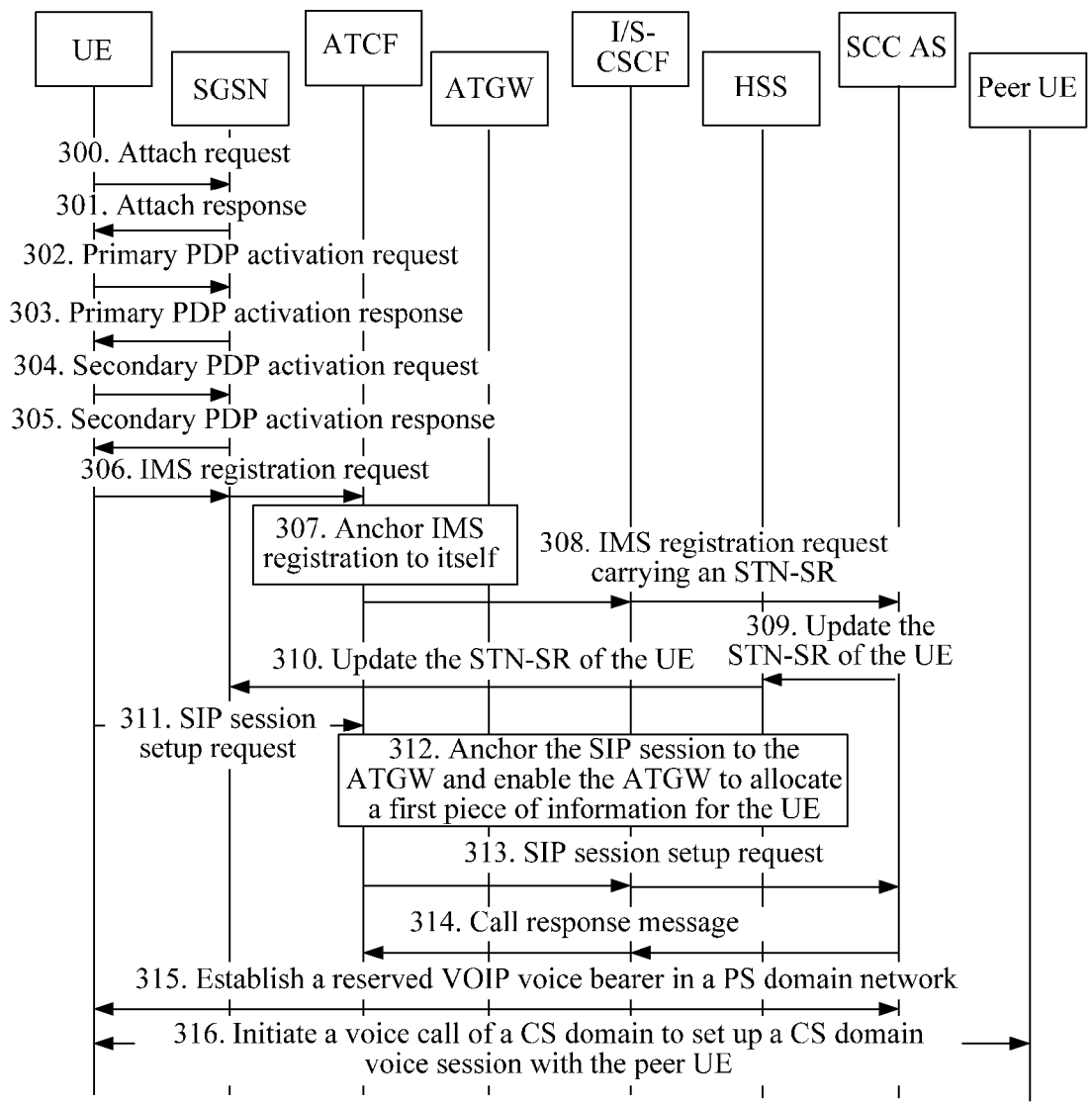
FIG. 3 is a signaling diagram of a procedure in which a user equipment performs IMS registration and sets up a SIP session in a PS domain before initiating a reverse SRVCC handover in a method for processing reverse single radio voice call continuity according to an embodiment of the present invention.

FIG. 3 is a signaling diagram of a procedure in which a user equipment performs IMS registration and sets up a SIP session in a PS domain before initiating a reverse SRVCC handover in a method for processing reverse single radio voice call continuity according to an embodiment of the present invention. In the signaling diagram of this embodiment, a UE that does not support DTM or UTMS mode and a first network element of the PS domain being an ATCF/ATGW are taken as examples to describe the specific process of performing, by the UE in advance in a PS domain network, IMS registration and SIP session setup. As shown in FIG. 3, in this embodiment, before the UE initiates a reverse SRVCC handover procedure, a preparation process performed in the PS domain network specifically includes the following steps:

step 300: the UE sends an attach request to an SGSN;

step 301: the SGSN returns an attach response to the UE;

step 302: the UE sends a primary PDP activation request to the SGSN;

step 303: the SGSN returns a primary PDP activation response to the UE;

step 304: the UE sends a secondary PDP activation request to the SGSN; and step 305: the SGSN returns a secondary PDP activation response to the UE.

Step 304 and step 305 are optional. When an SCC AS/ATCF receives a SIP session setup request, the secondary PDP may trigger a policy and charging rules function (Policy and Charging Rules Function, PCRF for short) to initiate bearer establishment.

In this embodiment, the UE that does not support DTM or UTMS mode is taken as an example for description, that is, the UE cannot support a CS domain voice bearer and a PS domain voice bearer at the same time. Therefore, the IMS registration, which is performed by the UE in the PS domain before the reverse SRVCC handover, needs to be performed before the UE initiates a voice call of a CS domain and sets up a CS domain voice session with a peer UE. In an actual application, the UE may perform the preparation operation in the PS domain immediately when being powered on.

Specifically, in this embodiment, the performing, by the UE, registration in the PS domain network may specifically be divided into two processes: the first process is that the UE performs, on the SGSN device, the registration in the PS domain network, and the second process is that the UE performs IMS registration and then initiates a SIP voice call. The first registration process may specifically include step 300 to step 305. Alternatively, in the attach request sent by the UE to the SGSN, the UE may further carry, in the attach request, information about a codec type (CodeC) supported by default in the PS domain network. Based on the CodeC information, the SGSN may learn the codec type supported by the UE in the PS domain network.

After the UE completes the registration in the PS domain network on the SGSN, the UE may further perform IMS registration on the SCC AS based on the registered information. Specifically, the IMS registration procedure may specifically include the following steps:

Step 306: The UE sends an IMS registration request to the ATCF through the SGSN.

Alternatively, in this step, after the SGSN receives the IMS registration request sent by the UE, the SGSN may further send the IMS registration request to the ATCF through a gateway GPRS support node (Gateway GPRS Support Node, GGSN for short).

Step 307: The ATCF anchors the IMS registration to itself.

Step 308: The ATCF allocates STN-SR information for the UE, carries the STN-SR in the IMS registration request, and forwards the IMS registration request to the SCC AS through an interrogating/serving call session control function (Interrogating/Serving Call Session Control Function, US-CSCF for short).

Step 309: The SCC AS updates the STN-SR of the UE to an HSS.

Step 310: The HSS updates the STN-SR of the UE to the SGSN.

After the UE completes, on the SGSN, the registration in the PS domain, alternatively, the UE may further initiate an IMS registration procedure to the SCC AS and further initiate a SIP session setup process to pre-establish a reserved VOIP voice bearer corresponding to the UE in the PS domain network through the process of setting up the SIP session with the SCC AS. Specifically, in this embodiment, the UE needs to anchor the IMS registration request to the ATCF network element first to initiate the SIP session setup through the ATCF. The anchor process may be implemented by sending, by the UE, the IMS registration request to the ATCF and anchoring, by the ATCF, the IMS registration process to ATCF itself after receiving the IMS registration request. Further, after anchoring the IMS registration process to itself, the ATCF may further allocate, for the UE, an STN-SR identifier of the UE in the PS domain network, carry the STN-SR in the IMS registration request, and forward the IMS registration request to the SCC AS through the US-CSCF so that the SCC AS updates the STN-SR identifier, which is allocated to the UE, to the data base HSS and then to the SGSN.

Step 311: The UE sends a SIP session setup request to the ATCF.

Step 312: The ATCF anchors the SIP session to the ATGW so that the ATGW allocates, for the UE, first information for bearing a VOIP voice service.

Step 313: The ATCF forwards the SIP session setup request to the SCC AS through the I/S-CSCF.

After the UE anchors the IMS registration request to the ATCF, the ATCF may further anchor the SIP session to the ATCF/ATGW when the UE sends the SIP session setup request to it. In the anchor process, the ATGW allocates, for the UE, the IP address and/or information for bearing the VOIP voice service of the UE, that is, the first piece of information. Specifically, after receiving the SIP session setup request of the UE and anchoring the SIP session to the ATGW, the ATCF forwards the SIP session setup request to the SCC AS through the I/S-CSCF. In this manner, the SCC AS completes UE context configuration and returns information configured for the UE to the ATCF through the US-CSCF. Alternatively, in this embodiment, the ATCF may terminate the SIP session setup request message on the ATCF.

Specifically, the initiating, by the UE, the SIP session setup request does not aim to actually set up a SIP session with the peer UE. The pre-established SIP session connection may not actually function before the UE initiates a voice service handover from the CS domain network to the PS domain network, and may be used only for allocating corresponding resources for the UE in a core network of the PS domain network and does not transmit any data. However, once the UE initiates the reverse SRVCC handover process of the voice service, in the reverse SRVCC handover process, the UE may quickly hand over, based on the preallocated resources, the voice service to the VOIP voice of the PS domain, and perform a subsequent access transfer procedure for the voice service. In this manner, a SIP session does not need to be initiated in the subsequent access transfer procedure to establish a VOIP voice bearer temporarily, which is equal to accelerating the subsequent access transfer procedure.

Therefore, the UE may carry reverse SRVCC indication information in the SIP session setup request sent by the UE through the ATCF, where the reverse SRVCC indication information is used to finally indicate to the SCC AS that the SIP session set up currently is used in the subsequent reverse SRVCC handover procedure, thereby indicating that, when setting up the SIP session for the UE according to the SIP session setup request, the SCC AS only needs to locally process the SIP session setup request message, does not need to initiate an actual voice call to the peer UE, and even when no data is transmitted on the reserved SIP session connection for a long period of time, does not need to proactively trigger the process of releasing information about resources of the UE.

In the actual application, the carrying, by the UE, the reverse SRVCC indication information in the SIP session setup request sent to the SCC AS may specifically be implemented in the following two manners: the UE may separately carry a piece of indication information in the SIP session setup request, for example, rSRVCC indicator information; or the UE may also carry a special called number in the SIP session setup request sent to the SCC AS, so as to indicate that, when receiving the SIP session setup request that carries the called number, the SCC AS learns that the SIP session is used in the reverse SRVCC handover.

Further, preferably, in the process of sending, by the UE, the SIP session setup request to the SCC AS through the SGSN, the UE may further send another piece of indication information to the SGSN besides finally sending the reverse SRVCC indication information to the SCC AS. The indication information is used to indicate that the SGSN does not need to initiate an RAB establishment process after the SIP session is set up in the PS domain network for the UE. Before the reverse SRVCC handover, the actual function of establishing the SIP session connection for the UE is preparing for the subsequent reverse SRVCC handover process. Before the reverse SRVCC handover procedure is performed, the SIP session connection does not transmit any voice data of the UE. Therefore, accordingly, the SGSN does not need to initiate an actual RAB establishment process, thereby avoiding a waste of resources. Specifically, for the method for the UE to send the indication information to the SGSN, reference may be made to the description in the preceding embodiment and no further description is provided here.

In addition, it should further be noted that if the UE does not report its supported CodeC information in the PS domain network to the SGSN in the procedure for attaching to the SGSN, alternatively, in the signaling interaction process of setting up the SIP session by the UE and the SCC AS in this step, the UE may further negotiate, with the SCC AS, the CodeC information of the UE in the PS domain network. After the negotiation is successful, the SCC AS carries the negotiated CodeC information in a SIP response message and returns the SIP response message to the UE. In addition, information used for identifying, for example, a destination IP address of service sending of the UE in the PS domain network may also be negotiated by the UE and the SCC AS in the signaling interaction process, and the negotiated IP address information is carried by the SCC AS in the SIP response message and returned to the UE together with the CodeC information.

Step 314: The SCC AS returns a call response message to the ATCF through the VS-CSCF, where the call response message may include UE-related configuration information, for example, a correlation-MSISDN (Correlation-MSISDN, C-MISDN for short).

After processing the SIP session setup request sent by the UE, the SCC AS returns the call response message to the ATCF through the US-CSCF. Alternatively, in the returned call response message, the SCC AS may further return, to the ATCF, the C-MSISDN number that is allocated for the UE and corresponds to the SIP session set up for the UE, and allocate, for the UE, a special number, for example, an rSRVCC access transfer identifier (rSRVCC Access Transfer Update-Session Transfer Identifier, rSRVCC ATU-STI for short), and return the special number to the ATCF. The ATCF stores the special number and the C-MSISDN number that are returned by the SCC AS. At the same time, the ATCF directly returns the call response message to the UE, where the call response message does not carry the stored information. In this case, a voice bearer is established between the UE and the ATGW.

Step 315: The UE establishes a reserved VOIP voice bearer in the PS domain network with the SCC AS.

After the UE completes the IMS procedure in the PS domain network, alternatively, the UE may further establish, with the SCC AS, the reserved VOIP voice bearer in the PS domain network, which specifically refers to that a PS media plane between the UE, the SGSN, an SGW, a PGW and the ATGW is established. The reserved VOIP voice bearer may be used in the subsequent reverse SRVCC handover process. The reserved VOIP voice bearer that is pre-established is used in the subsequent reverse SRVCC handover process and is in suspended state before the handover. By pre-establishing the suspended VOIP voice bearer, the UE does not need to establish a VOIP voice bearer when the UE actually initiates the reverse SRVCC handover process, thereby accelerating the voice service handover to the PS domain network.

Step 316: The UE initiates a voice call of a CS domain to set up a CS domain voice session with the peer UE.

After completing the IMS registration and pre-establishing the reserved VOIP voice bearer between the UE and the SCC AS in the PS domain, the UE may initiate a voice call of the CS domain to the peer UE according to a regular CS domain voice session procedure to set up a CS domain voice session with the peer UE.

It should be noted that, in the process of performing, by the UE, registration in the PS domain network in this embodiment, if the UE supports DTM mode, that is, the voice service of the UE can be borne in the CS domain and the PS domain at the same time, in the preceding step, the registration performed by the UE in the PS domain network may be completed after the UE sets up the CS domain voice session in the CS domain network. That is, the UE sets up a normal voice session in the CS domain network first, and then needed resources are allocated in the PS domain network for the UE. In this manner, the voice service is borne in the CS domain network and the situation that registration of a new voice service affects a voice service in the original CS domain network is avoided.

Figure 4:
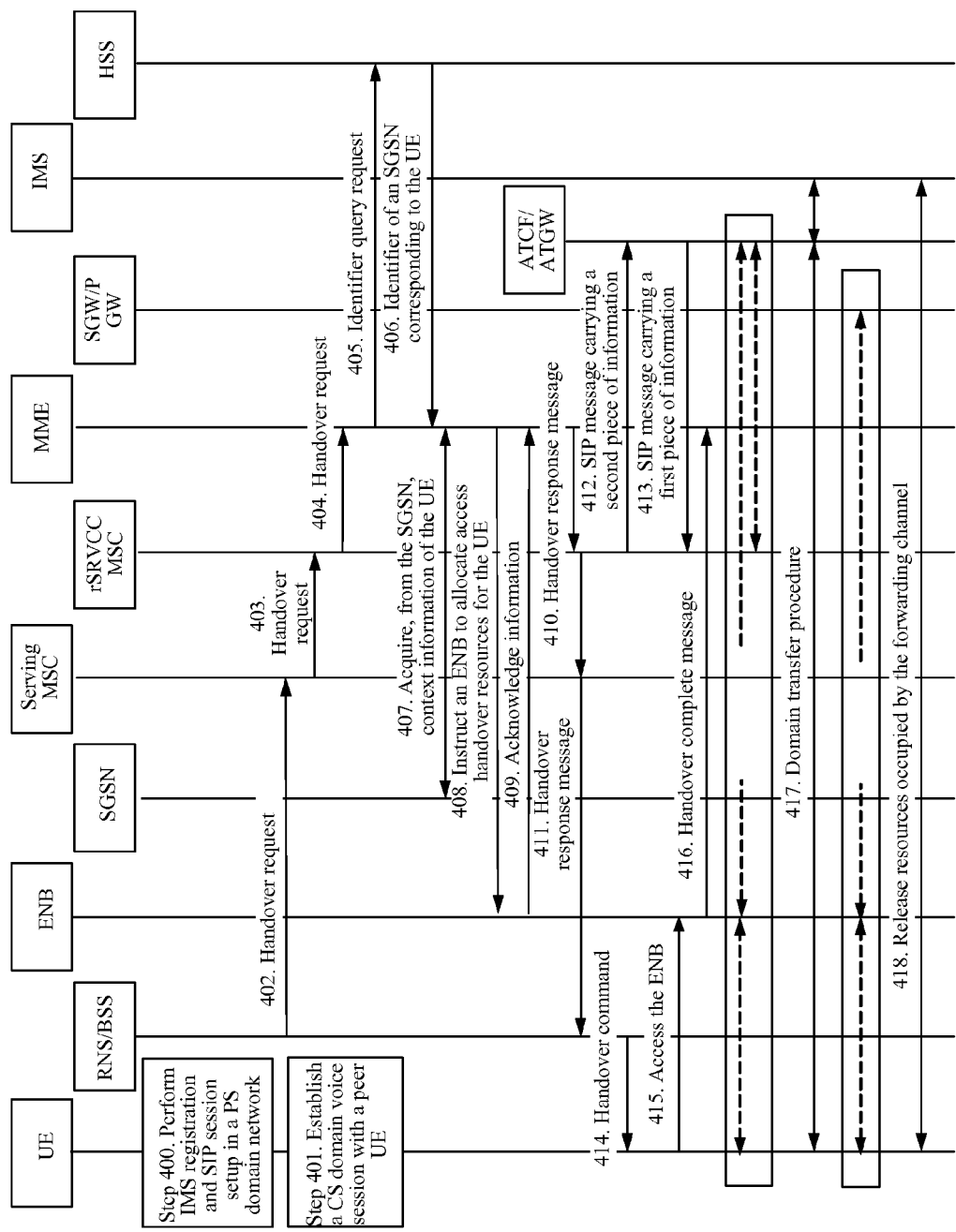
FIG. 4 is a flow chart of a method for processing reverse single radio voice call continuity according to Embodiment 3 of the present invention.

FIG. 4 is a signaling diagram of a method for processing reverse single radio voice call continuity according to Embodiment 3 of the present invention. A reverse SRVCC handover process in this embodiment is performed based on the pre-registration of the UE described in the preceding embodiment and signaling diagram. In this embodiment, however, a UE that does not support DTM or UTMS mode and a first network element of a PS domain being an ATCF/ATGW are taken as examples to describe the specific process of a reverse SRVCC handover performed by the UE. It should be noted that, in regard to the first network element being the ATCF/ATGW, in this embodiment, a process of establishing a forwarding channel between the ATCF/ATGW and an rSRVCC MSC may be controlled by an MME or be completed by proactively querying, by the rSRVCC MSC, related information from an HSS. Only the process of establishment controlled by the MME is described in detail in this embodiment, and the other process is described in detail in the following embodiment. In addition, it should further be noted that, in an actual application, the ATCF and the ATGW are generally deployed together. Therefore, in this embodiment, the first network element ATGW is described as the ATCF/ATGW, indicating that signaling messages sent by other network elements to the ATGW may be forwarded by the ATCF to the ATGW.

As shown in FIG. 4, the method includes the following steps.

Step 400: The UE performs IMS registration and sets up a SIP session in a PS domain network so that the PS domain network preallocates information about resources for the UE.

Step 401: The UE initiates a voice call of a CS domain to set up a CS domain voice session with a peer UE.

For the specific process of step 400, reference may be made to the specific description of the preceding signaling diagram. Before performing the reverse SRVCC handover, the UE performs registration and establishes a SIP session connection in advance in the PS domain network so that the PS domain network preallocates information about reserved resources for the UE. Further, based on the preallocated information about resources, the UE may further pre-establish a reserved VOIP voice bearer for a voice service in the PS domain network. In this embodiment, the UE that does not support DTM or UTMS mode is taken as an example for description. Therefore, the pre-registration process performed by the UE in the PS domain network needs to be performed before the process of setting up a normal CS domain voice session, so as to avoid the situation that registration of a new voice service affects a voice service in the original CS domain network.

Step 402: A radio network subsystem (Radio Network Subsystem, RNS for short)/base station system (Base Station System, BSS for short) sends a handover request to a serving MSC.

In this embodiment, it is assumed that the UE does not support DTM or UTMS mode, that is, the UE only supports one type of voice bearer. Therefore, in the process of initiating, by the RNS/BSS, the reverse SRVCC handover, only a bearer of CS domain voice type needs to be handed over. Therefore, in this step, the RNS/BSS needs to send the handover request only to the serving MSC. However, it should be noted that if in this embodiment, the UE supports DTM or UMTS mode, in this step, the RNS/BSS needs to send the handover request to the serving MSC and an SGSN at the same time.

Alternatively, the BSS/RNS may further carry reverse SRVCC indication information in the handover request when sending the handover request to the serving MSC, so as to notify, through the serving MSC, the MME or the rSRVCC MSC that the handover is rSRVCC. In this case, in the subsequent procedure, the MME may contact a home subscriber server (Home Subscriber Server, HSS for short) according to the indication information to acquire identifier information of a corresponding SGSN.

Step 403: The serving MSC forwards the handover request to the rSRVCC MSC.

Step 404: The rSRVCC MSC forwards the handover request to the MME.

After receiving the handover request of the RNS/BSS, the serving MSC forwards the handover request (rSRVCC CS to PS request) to the rSRVCC MSC. In order to respond to the handover request, the rSRVCC MSC allocates, for the UE, second information such as an IP address and/or a port.

Step 405: The MME sends an identifier query request to the HSS to acquire the identifier of an SGSN serving the UE.

Step 406: The HSS returns the identifier of an SGSN corresponding to the UE to the MME.

After the MME receives the handover request forwarded by the rSRVCC MSC, in order to enable the rSRVCC MSC to address to the corresponding ATCF/ATGW to exchange IP address and/or port information with the ATCF/ATGW and thereby establish a forwarding channel, the MME first needs to acquire, from the data base HSS, the identifier of the SGSN corresponding to the UE, and thereby acquire, from the corresponding SGSN, STN-SR information and related voice bearer information of the UE in the PS domain network, so as to address to the corresponding ATCF/ATGW according to the STN-SR.

Therefore, in this embodiment, after receiving the handover request forwarded by the rSRVCC MSC, the MME sends the identifier query request message to the HSS, where the identifier query request message may specifically be a location update request or a request message of another type, and the identifier query request message carries the identifier of the UE to instruct the HSS to return the identifier of the SGSN which a specified UE belongs to. After receiving the location update request carrying the identifier of the UE, the HSS queries the specified UE in the local data base and returns the found identifier of the SGSN corresponding to the UE to the MME. Alternatively, the identifier request message sent by the MME to the HSS may further carry rSRVCC indicator information to notify the HSS that the current query is used in an rSRVCC handover operation.

Step 407: The MME acquires, from the SGSN, context information of the UE.

After acquiring the identifier of the SGSN corresponding to the UE, the MME addresses to the corresponding SGSN and performs signaling interaction with the SGSN, so as to acquire, from the SGSN, the context information of the UE, where the context information includes the STN-SR information and CodeC information that are registered in the PS domain network by the UE.

Step 408: The MME instructs an ENB to allocate access handover resources for the UE.

Step 409: The ENB sends acknowledge information to the MME to acknowledge that allocation of the access handover resources is completed.

In this situation, the MME has acquired the context information of the UE. Alternatively, in order to enable the UE to successfully access the PS domain network and complete the access operation in the PS domain network, the MME may further instruct the ENB in the PS domain network to prepare access handover resources for the UE. After resource allocation is completed, the ENB sends an acknowledge message to the MME to notify that the allocation of the access handover resources prepared for the UE is completed.

Step 410: The MME sends a handover response message to the rSRVCC MSC, where the handover response message carries the acquired context information of the UE.

After the ENB sends the acknowledge message to the MME and the MME learns that the ENB completes the allocation of access handover resources for the UE, the MME may further returns the handover response message to the rSRVCC MSC, where the handover response message carries the context information of the UE acquired from the SGSN in step 407, that is, the STN-SR and CodeC information that are registered in the PS domain network by the UE in the pre-registration process. In this manner, the context information of the UE is forwarded to the rSRVCC MSC by using the handover response message. The Codec information is optional. Based on the CodeC information, the rSRVCC MSC is capable of performing a corresponding encoding operation on uplink voice data when forwarding the uplink voice data of the UE to the ATGW and after establishing the forwarding channel with the ATGW, and then forwarding encoded uplink voice data to the UE.

Step 411: The rSRVCC MSC returns the handover response message to the RNS/BSS through the serving MSC.

To complete the access operation of the UE in the RNS/BSS as soon as possible, the rSRVCC MSC may further forward the handover response message through the MSC, so as to notify the RNS/BSS that the allocation of the access handover resources prepared for the UE is completed.

Step 412: The rSRVCC MSC sends a SIP message to the ATCF/ATGW, where the SIP message carries the second information allocated by the rSRVCC MSC.

Step 413: The ATCF/ATGW returns a SIP response message to the rSRVCC MSC, where the SIP response message carries the first information allocated by the ATCF/ATGW.

Specifically, after the rSRVCC MSC learns the context information of the UE, because in the pre-registration process of the UE, the UE has anchored the IMS registration to the ATCF, the rSRVCC MSC may directly address to the corresponding ATCF/ATGW according to the STN-SR information to exchange IP address and/or port information with the ATCF/ATGW, thereby establishing a forwarding channel with the ATCF/ATGW.

Step 414: The RNS/BSS sends a handover command to the UE.

Step 415: The UE accesses the ENB.

Step 416: The ENB sends a handover complete message to the MME.

When the rSRVCC MSC exchanges the IP address and/or port information with the ATCF/ATGW and after the RNS/BSS receives the handover response message sent by the MSC, in order to complete the access of the UE to the PS domain network as soon as possible, the RNS/BSS sends the handover command to the UE to instruct the UE to perform the operation of accessing the PS domain network (EUTRAN). In this manner, by using the access handover resources allocated by the ENB for the UE, the UE successfully accesses the ENB, that is, accesses the PS domain network, and completes the network access procedure. After the procedure of access of the UE to the ENB is completed, the ENB sends the handover complete message to the MME to notify the MME that the access to the PS domain network is completed.

After both the IP address and/or port information exchange between the rSVCC MSC and the ATCF/ATGW and the access of the UE to the ENB are completed, new voice bearer paths are established between the UE and the peer UE. Downlink voice data sent by the UE to the peer UE may be sent to the peer UE through the downlink voice bearer path "UE-ENB-SGW-PGW-ATGW-rSVCC MSC-Peer UE", and uplink voice data sent by the peer UE to the UE may be sent to the UE through the reverse bearer path "Peer UE-rSVCC MSC-ATGW-PGW-SGW-ENB-UE" (as shown by the dashed lines below step 416 in FIG. 4). In this manner, even before an access transfer procedure is started or when the access transfer procedure is not completed, the UE and the peer UE are also capable of performing voice data communication through the bearer paths without the need of interrupting the voice service, thereby ensuring good continuity of the voice service. Further, the bearer paths are established on the basis that the UE completes the access to the PS domain network. Therefore, the voice service based on the current UE is further capable of achieving good quality of the voice service.

Step 417: The ATCF/ATGW initiates the access transfer procedure.

Step 418: After the access transfer procedure is completed, release resources occupied by the forwarding channel.

After the bearer paths are successfully established and the UE is capable of performing voice data communication with the peer UE through the bearer paths, in this embodiment, in order to actually hand over the voice service between the UE and the peer UE to the PS domain network, alternatively, the ATCF/ATGW may further initiate the access transfer procedure. The access transfer procedure is performed on the basis that the UE is capable of performing a normal VOIP voice service with the peer UE. Therefore, the speed of the access transfer procedure does not affect the continuity of the voice service of the UE. Specifically, for the process of initiating the access transfer by the ATCF/ATGW, reference may be made to FIG. 5. It should be noted that if the UE does not perform the IMS registration procedure in the pre-registration procedure performed by the UE in the PS domain network, the UE needs to perform IMS registration in the PS domain network first before the ATCF/ATGW initiates the access transfer procedure.

After the access transfer procedure is completed, the UE may perform voice data communication with the peer UE by using new voice bearer paths established in the access transfer process, that is, perform the voice service with the peer UE through the downlink voice bearer path "UE-ENB-SGW-PGW-ATGW-Peer UE" and the uplink voice bearer path "Peer UE-ATGW-PGW-SGW-ENB-UE" (as shown by the dashed lines below step 417 in FIG. 4). In this manner, the rSVCC MSC may control release of the resources occupied by the forwarding channel to actually complete the reverse SRVCC handover procedure. Specifically, a resource releasing process may be initiated by the ATCF.

In addition, in this embodiment, it should further be noted that if the UE does not pre-establish the reserved VOIP voice bearer with the SCC AS in step 315 in the pre-registration process in the PS domain network, that is, the UE does not establish the reserved VOIP voice bearer before the reverse SRVCC handover process, in this embodiment, after the RNS/BSS sends the handover request to the MSC in step 402, a core network element in the PS domain network is to proactively trigger establishment of a VOIP voice bearer of the UE in the PS domain network. Specifically, the process of establishing the VOIP voice bearer may be triggered by the SGSN, the MSC, the ATCF, or another core network element in the PS domain network immediately after step 402. Compared with the solution in which the reserved VOIP voice bearer is established before the reverse SRVCC handover procedure, in this solution in which the VOIP voice bearer is established in the reverse SRVCC handover process, the situation that related voice resources need to be reserved in the PS domain network before the reverse SRVCC handover is avoided, thereby avoiding a waste of resources in the PS domain network.

According to the method for processing reverse single radio voice call continuity in this embodiment, before a UE hands over a voice service from a CS domain network to a PS domain network, the UE performs IMS registration and initiates SIP session setup in advance in the PS domain network so that the PS domain network preallocates information about bearer resources for the UE. In the process of handing over, by the UE, the voice service from the CS domain network to the PS domain network, the MME controls establishment of a forwarding channel of voice data between an rSRVCC MSC in the CS domain network and an ATGW in the PS domain network by using information about a reserved bearer, in which the information is preallocated by the PS domain network for the UE. In this manner, after the UE actually initiates the voice service handover from the CS domain network to the PS domain network and quickly accesses the PS domain network, the UE is capable of quickly transmitting voice data with a peer user equipment through the established forwarding channel without the need of waiting a long time before an access transfer procedure is completed. This ensures good performance of voice service continuity in the reverse SRVCC handover process. Further, the forwarding channel is established on the basis that the UE completes the access to the PS domain network. Therefore, the voice service performed based on the forwarding channel is further capable of achieving good quality of the voice service.

Figure 5:
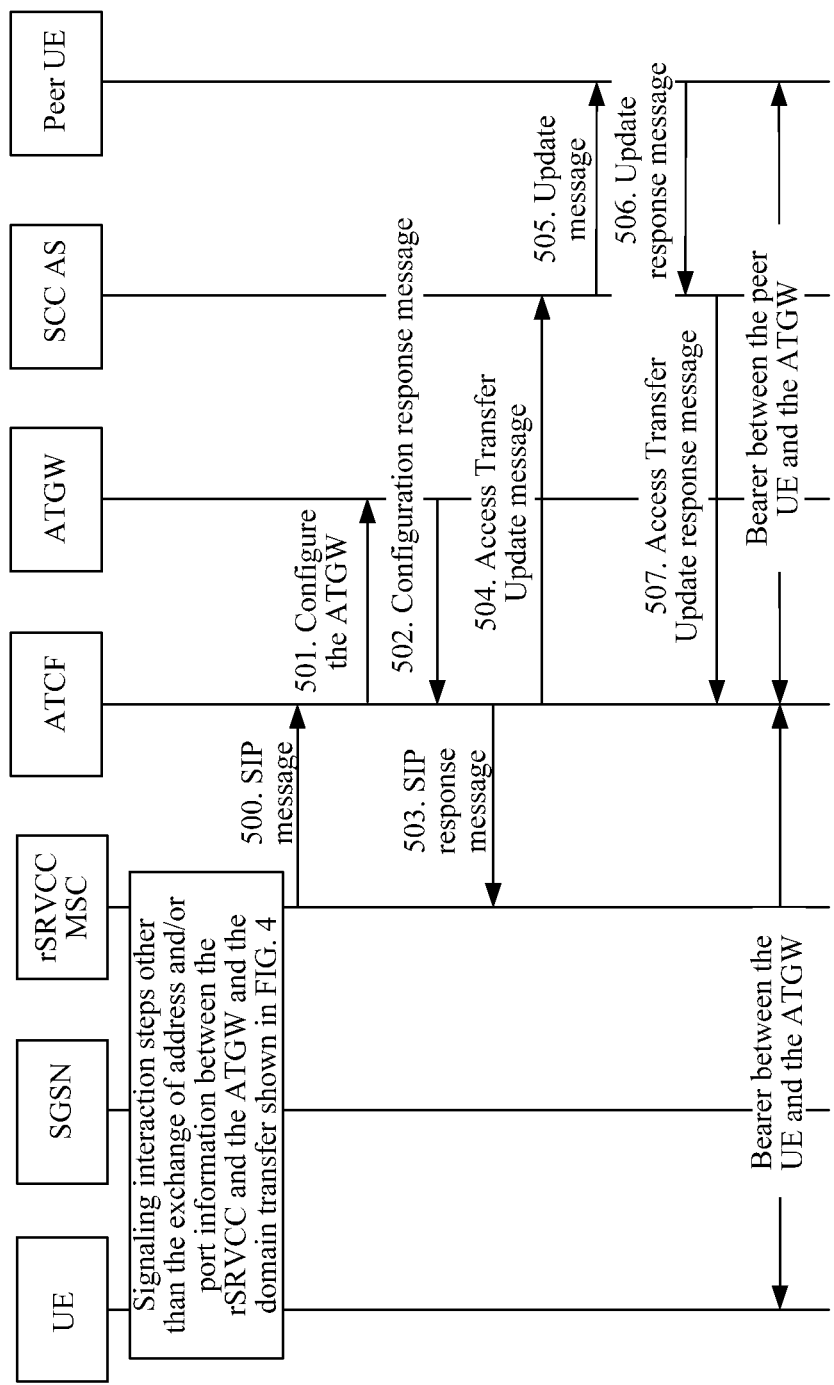
FIG. 5 is a signaling diagram of an access transfer procedure in a method for processing reverse single radio voice call continuity according to an embodiment of the present invention.

FIG. 5 is a signaling diagram of an access transfer procedure in a method for processing reverse single radio voice call continuity according to an embodiment of the present invention. A detailed process of exchanging IP address and/or port information by an rSRVCC MSC and an ATGW is also described in the signaling diagram in this embodiment. As shown in FIG. 5, based on the preceding embodiment, after the handover response message is returned to the RNS/BSS through the serving MSC in step 411, the process of exchanging port and/or port information by the rSRVCC MSC and the ATGW and the access transfer procedure initiated by the ATCF are specifically as follows.

Step 500: The rSRVCC MSC sends, to the ATCF, a SIP message (INVITE message) carrying a C-MSISDN number and IP address and/or port information.

Step 501: The ATCF configures the ATGW according to the received SIP message.

Specifically, after addressing to the corresponding ATCF according to the STN-SR information, the rSRVCC MSC carries the IP address and/or port information allocated to the UE and the C-MSISDN number acquired in advance in the SIP message, and sends the SIP message to the ATCF. The C-MSISDN number is associated with the SIP session set up in advance for the UE. The ATCF may find, according to the C-MSISDN number, the SIP session corresponding to the UE.

After receiving the SIP message, the ATCF uses the C-MSISDN to associate with the session that needs to be transferred and then interacts with the ATGW. In this manner, a media plane is updated and the pre-established voice bearer is associated with a new bearer, that is, the new bearer between the rSRVCC MSC and the ATGW.

Step 502: The ATGW returns a Configure ATGW Acknowledgment (Configure ATGW Acknowledgment) message to the ATCF, where the IP address and/or port information preallocated by the ATGW for the UE is sent to the ATCF.

Step 503: The ATCF returns a SIP response message to the rSRVCC MSC, where the SIP response message carries the IP address and/or port information of the ATGW.

Step 504: The ATCF sends an Access Transfer Update (Access Transfer Update) message to the SCC AS.

Step 505: The SCC AS forwards the Access Transfer Update message to the peer UE.

After receiving a CS-PS access transfer message, the ATCF re-establishes a session with the SCC AS to notify the SCC AS that CS-PS access transfer occurs. The SCC AS locates a related session by using an rSRVCC ATU-STI, and a new session is set up between the ATCF and the SCC AS. At the same time, the SCC AS associates the new session with the SIP session set up in advance by the UE in the registration process, where the association operation is generally implemented by using the C-MSISDN.

Alternatively, the SCC AS updates the media plane of the peer UE to enable the peer UE to directly send voice data to the ATGW. At the same time, the peer UE is capable of directly receiving voice data sent by the ATGW.

Step 506: The peer UE returns an update response message to the SCC AS.

Step 507: The SCC AS returns an Access Transfer Update response message to the ATCF.

In this situation, new voice bearer paths are established between the UE and the peer UE. The new voice bearer paths established after the access transfer are specifically the downlink voice bearer path "UE-ENB-SGW-PGW-ATGW-Peer UE" and the uplink voice bearer path "Peer UE-ATGW-PGW-SGW-ENB-UE".

Figure 6:
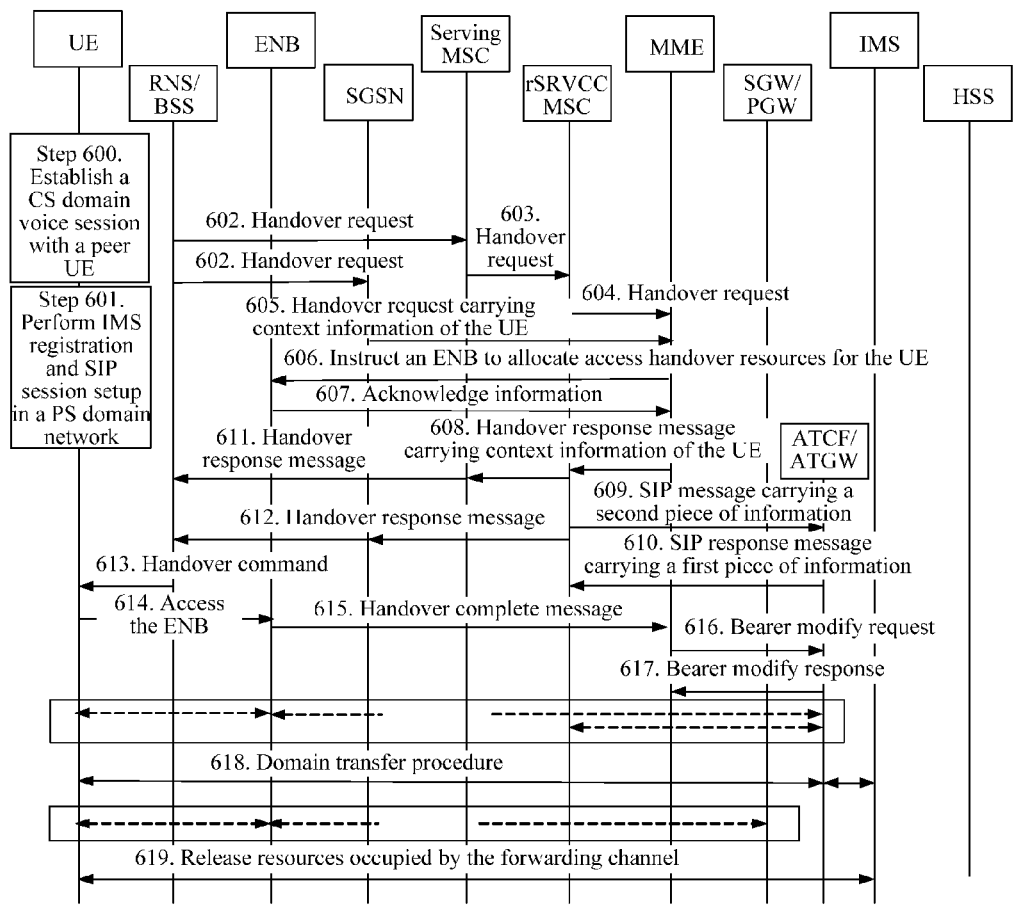
FIG. 6 is a signaling diagram of a method for processing reverse single radio voice call continuity according to Embodiment 4 of the present invention.

FIG. 6 is a signaling diagram of a method for processing reverse single radio voice call continuity according to Embodiment 4 of the present invention. A reverse SRVCC handover process in this embodiment is performed based on the pre-registration of the UE described in the embodiment and signaling diagram illustrated in FIG. 3. In this embodiment, however, a UE that supports DTM or UTMS mode and a first network element of a PS domain being an ATCF/ATGW are taken as examples to describe the specific process of a reverse SRVCC handover performed by the UE. Only the process of controlling, by an MME, establishment of a forwarding channel between the ATCF/ATGW and an rSRVCC MSC is described in detail. It should further be noted that the difference between this embodiment and the embodiment illustrated in FIG. 4 lies in that the UE in this embodiment supports DTM or UTMS mode whereas the UE in the preceding embodiment does not support DTM or UTMS mode. Therefore, in this embodiment, for a step same as that in the embodiment illustration in FIG. 4, reference may be made to the corresponding description in the embodiment illustration in FIG. 4.

As shown in FIG. 6, the method includes the following steps:

Step 600: The UE initiates a voice call of a CS domain to set up a CS domain voice session with a peer UE.

Step 601: The UE performs IMS registration and sets up a SIP session in a PS domain network so that the PS domain network preallocates information about resources for the UE.

In this embodiment, the UE that supports DTM or UTMS mode is taken as an example for description. Therefore, the pre-registration process performed by the UE in the PS domain network may be performed after the process of setting up a normal CS domain voice session without occurrence of the situation that registration of a new voice service affects a voice service in the original CS domain network.

Step 602: An RNS/BSS sends a handover request to a serving MSC and an SGSN at the same time.

Step 603: The serving MSC forwards the handover request to an rSRVCC MSC.

Step 604: The rSRVCC MSC forwards the handover request to an MME.

Step 605: The SGSN carries context information of the UE in the handover request, and forwards the handover request to the MME.

In this embodiment, the UE supports DTM or UMTS mode. Therefore, the MME does not need to send an identifier query request to an HSS to acquire, from the HSS and by using the location update request, the identifier of an SGSN corresponding to the UE, and thereby address to the SGSN. In this embodiment, the SGSN proactively forwards the context information of the UE to the MME on the basis that the handover request sent by the RNS/BSS is received. In this case, the MME is capable of automatically acquiring the context information pre-registered in the PS domain network by the UE without the need of sending the identifier query request to the HSS.

Step 606: The MME instructs an ENB to allocate access handover resources for the UE.

Step 607: The ENB sends acknowledge information to the MME to acknowledge that allocation of the access handover resources is completed.

In this situation, in order to enable the UE to access the PS domain network and complete the access operation in the PS domain network, the MME may instruct the ENB in the PS domain network to prepare access handover resources for the UE. After the resource allocation is completed, the ENB sends an acknowledge message to the MME to notify that the allocation of the access handover resources prepared for the UE is completed.

Step 608: The MME sends a handover response message to the rSRVCC MSC, where the handover response message carries the context information of the UE.

Step 609: The rSRVCC MSC sends a SIP message to the ATCF/ATGW, where the SIP message carries second information allocated by the rSRVCC MSC.

Step 610: The ATCF/ATGW returns a SIP response message to the rSRVCC MSC, where the SIP response message carries first information allocated by the ATCF/ATGW.

Specifically, after the rSRVCC MSC learns the context information of the UE, because in the pre-registration process of the UE, the UE has anchored the IMS registration to the ATCF, the rSRVCC MSC may directly address to the corresponding ATCF/ATGW according to the STN-SR information to exchange IP address and/or port information with the ATCF/ATGW, thereby establishing a forwarding channel with the ATCF/ATGW.

Step 611: The rSRVCC MSC returns the handover response message to the RNS/BSS through the serving MSC.

Step 612: The MME returns the handover response message to the RNS/BSS through the SGSN.

At the same time, after step 607, the MME further returns the handover response message to the SGSN after learning that the ENB completes the allocation of the access handover resources for the UE, so that the SGSN forwards the handover response message to the RNS/BSS to notify the RNS/BSS that access handover resource has been allocated in the ENB for the UE.

Step 613: The RNS/BSS sends a handover command to the UE.

Step 614: The UE accesses the ENB.

Step 615: The ENB sends a handover complete message to the MME.

Step 616: The MME sends a bearer modify request to the ATCF/ATGW.

Step 617: The ATCF/ATGW returns a bearer modify response message to the MME.

After both the IP address and/or port information exchange between the rSVCC MSC and the ATCF/ATGW and the access of the UE to the ENB are completed, new voice bearer paths are established between the UE and the peer UE. Downlink voice data sent by the UE to the peer UE may be sent to the peer UE through the downlink voice bearer path "UE-ENB-SGW-PGW-ATGW-rSVCC MSC-Peer UE", and uplink voice data sent by the peer UE to the UE may be sent to the UE through the reverse bearer path "Peer UE-rSVCC MSC-ATGW-PGW-SGW-ENB-UE". In this manner, even before an access transfer procedure is started or when the access transfer procedure is not completed, the UE and the peer UE are also capable of performing voice data communication through the bearer paths without the need of interrupting the voice service, thereby ensuring good continuity of the voice service. Further, the bearer paths are established on the basis that the UE completes the access to the PS domain network. Therefore, the voice service based on the current UE is further capable of achieving good quality of the voice service.

Step 618: The ATCF/ATGW initiates the access transfer procedure.

Step 619: After the access transfer procedure is completed, release resources occupied by the forwarding channel.

After the bearer paths are successfully established and the UE is capable of performing voice data communication with the peer UE through the bearer paths, in this embodiment, in order to actually hand over the voice service between the UE and the peer UE to the PS domain network, alternatively, the ATCF/ATGW may further initiate the access transfer procedure. After the access transfer procedure is completed, the UE may perform voice data communication with the peer UE by using new voice bearer paths established in the access transfer process, that is, perform the voice service with the peer UE through the downlink voice bearer path "UE-ENB-SGW-PGW-ATGW-Peer UE" and the uplink voice bearer path "Peer UE-ATGW-PGW-SGW-ENB-UE". In this manner, the rSVCC MSC may control release of the resources occupied by the forwarding channel to actually complete the reverse SRVCC handover procedure. Specifically, the resource releasing process may be initiated by the ATCF.

According to the method for processing reverse single radio voice call continuity in this embodiment, before a UE hands over a voice service from a CS domain network to a PS domain network, the UE performs IMS registration and initiates SIP session setup in advance in the PS domain network so that the PS domain network preallocates information about bearer resources for the UE. In the process of handing over, by the UE, the voice service from the CS domain network to the PS domain network, the MME controls establishment of a forwarding channel of voice data between an rSRVCC MSC in the CS domain network and an ATGW in the PS domain network by using information about a reserved bearer, in which the information is preallocated by the PS domain network for the UE. In this manner, after the UE actually initiates the voice service handover from the CS domain network to the PS domain network and quickly accesses the PS domain network, the UE is capable of quickly transmitting voice data with a peer user equipment through the established forwarding channel without the need of waiting a long time before an access transfer procedure is completed. This ensures good performance of voice service continuity in the reverse SRVCC handover process. Further, the forwarding channel is established on the basis that the UE completes the access to the PS domain network. Therefore, the voice service performed based on the forwarding channel is further capable of achieving good quality of the voice service.

Figure 7:
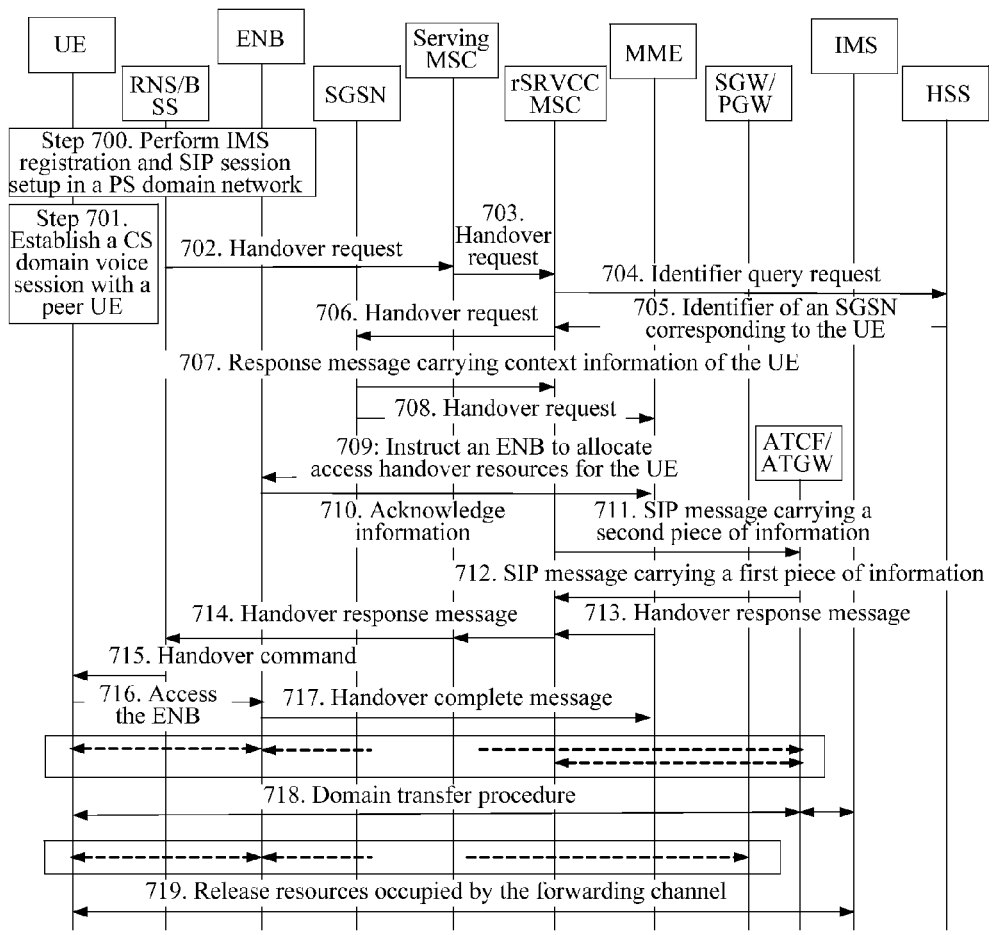
FIG. 7 is a signaling diagram of a method for processing reverse single radio voice call continuity according to Embodiment 5 of the present invention.

FIG. 7 is a signaling diagram of a method for processing reverse single radio voice call continuity according to Embodiment 5 of the present invention. A reverse SRVCC handover process in this embodiment is performed based on the pre-registration of the UE described in the preceding embodiment and signaling diagram. In this embodiment, however, a UE that does not support DTM or UTMS mode and a first network element of a PS domain being an ATCF/ATGW are taken as examples to describe the specific process of a reverse SRVCC handover performed by the UE. It should be noted that, in regard to the first network element being the ATCF/ATGW, in this embodiment, a process of establishing a forwarding channel between the ATCF/ATGW and an rSRVCC MSC may be controlled by an MME or be completed by proactively querying, by the rSRVCC MSC, related information from an HSS. The process of establishment implemented by proactively querying, by the rSRVCC MSC, related information from the HSS is described in detail in this embodiment. In addition, it should further be noted that, in an actual application, the ATCF and the ATGW are generally deployed together. Therefore, in this embodiment, the first network element ATGW is described as the ATCF/ATGW, indicating that signaling messages sent by other network elements to the ATGW may be forwarded by the ATCF to the ATGW.

As shown in FIG. 7, the method includes the following steps.

Step 700: The UE performs IMS registration and sets up a SIP session in a PS domain network so that the PS domain network preallocates information about resources for the UE.

Step 701: The UE initiates a voice call of a CS domain to set up a CS domain voice session with a peer UE.

In this embodiment, the UE that does not support DTM or UTMS mode is taken as an example for description. Therefore, the pre-registration process performed by the UE in the PS domain network needs to be performed before the process of setting up a normal CS domain voice session to avoid the situation that registration of a new voice service affects a voice service in the original CS domain network.

Step 702: An RNS/BSS sends a handover request to a serving MSC.

In this embodiment, it is assumed that the UE does not support DTM or UTMS mode, that is, the UE only supports one type of voice bearer. Therefore, in the process of initiating, by the RNS/BSS, the reverse SRVCC handover, only a bearer of CS domain voice type needs to be handed over. Therefore, in this step, the RNS/BSS needs to send the handover request only to the serving MSC. Alternatively, the BSS/RNS may further carry reverse SRVCC indication information in the handover request when sending the handover request to the serving MSC.

Step 703: The serving MSC forwards the handover request to the rSRVCC MSC.

Step 704: The rSRVCC MSC sends an identifier query request to the HSS, where the identifier query request carries the identifier of the UE.

Step 705: The HSS returns the identifier of an SGSN corresponding to the UE to the rSRVCC MSC.

In this embodiment, after receiving the handover request forwarded by the serving MSC, the rSRVCC MSC sends, to the HSS, the identifier query request carrying the identifier of the UE, to directly query and acquire, from the data base HSS, identifier information of the SGSN corresponding to the UE instead of acquiring the identifier of the SGSN through an MME. The identifier query request message may specifically be a location update request or a request message of another type. Alternatively, the identifier request message sent by the MME to the HSS may further carry rSRVCC indicator information to notify the HSS that the current query is used in the rSRVCC handover operation.

Step 706: The rSRVCC MSC forwards the handover request to a specified SGSN.

Step 707: The SGSN returns a response message to the rSRVCC MSC, where the response message carries context information of the UE.

After acquiring the identifier of the SGSN corresponding to the UE, the rSRVCC MSC addresses to the corresponding SGSN and forwards the handover request to the SGSN, where the handover request may carry instruction information to instruct the SGSN to return the context information of the UE, including STN-SR information and CodeC information that are registered in the PS domain network by the UE.

Step 708: The SGSN forwards the handover request to an MME.

Step 709: The MME instructs an ENB to allocate access handover resources for the UE.

Step 710: The ENB sends acknowledge information to the MME to acknowledge that allocation of the access handover resources is completed.

The SGSN forwards the handover request message to the MME at the same time of returning the response message to the rSRVCC MSC. In order to enable the UE to successfully access the PS domain network and complete the access operation in the PS domain network, the MME may further instruct the ENB in the PS domain network to prepare access handover resources for the UE. After the resource allocation is completed, the ENB sends an acknowledge message to the MME to notify that the allocation of the access handover resources prepared for the UE is completed.

Step 711: The rSRVCC MSC sends a SIP message to the ATCF/ATGW, where the SIP message carries second information allocated by the rSRVCC MSC.

Step 712: The ATCF/ATGW returns a SIP response message to the rSRVCC MSC, where the SIP response message carries first information allocated by the ATCF/ATGW.

At the same time, after step 707, the rSRVCC MSC acquires the context information of the UE. Because in the pre-registration process of the UE, the UE has anchored the IMS registration to the ATCF, the rSRVCC MSC may directly address to the corresponding ATCF/ATGW according to the STN-SR information in the context information to exchange IP address and/or port information with the ATCF/ATGW, thereby establishing the forwarding channel with the ATCF/ATGW.

Step 713: The MME sends a handover response message to the rSRVCC MSC.

Step 714: The rSRVCC MSC returns the handover response message to the RNS/BSS through the serving MSC.

Step 715: The RNS/BSS sends a handover command to the UE.

Step 716: The UE accesses the ENB.

Step 717: The ENB sends a handover complete message to the MME.

When the rSVCC MSC exchanges the IP address and/or port information with the ATCF/ATGW and after the RNS/BSS receives the handover response message sent by the MGW, in order to complete the access of the UE to the PS domain network as soon as possible, the RNS/BSS sends the handover command to the UE to instruct the UE to perform the operation of accessing the PS domain network (EU-TRAN). In this manner, by using the access handover resources allocated by the ENB for the UE, the UE successfully accesses the ENB, that is, accesses the PS domain network, and completes the network access procedure. After the procedure of access of the UE to the ENB is completed, the ENB sends the handover complete message to the MME to notify the MME that the access to the PS domain network is completed.

After both the IP address and/or port information exchange between the rSVCC MSC and the ATCF/ATGW and the access of the UE to the ENB are completed, new voice bearer paths are established between the UE and the peer UE. Downlink voice data sent by the UE to the peer UE may be sent to the peer UE through the downlink voice bearer path "UE-ENB-SGW-PGW-ATW-rSVCC MSC-Peer UE", and uplink voice data sent by the peer UE to the UE may be sent to the UE through the reverse bearer path "Peer UE-rSVCC MSC-ATGW-PGW-SGW-ENB-UE". In this manner, even before an access transfer procedure is started or when the access transfer procedure is not completed, the UE and the peer UE are also capable of performing voice data communication through the bearer paths without the need of interrupting the voice service, thereby ensuring good continuity of the voice service. Further, the bearer paths are established on the basis that the UE completes the access to the PS domain network. Therefore, the voice service based on the current UE is further capable of achieving good quality of the voice service.

Step 718: The ATCF/ATGW initiates the access transfer procedure.

Step 719: After the access transfer procedure is completed, release resources occupied by the forwarding channel.

After the bearer paths are successfully established and the UE is capable of performing voice data communication with the peer UE through the bearer paths, in this embodiment, in order to actually hand over the voice service between the UE and the peer UE to the PS domain network, alternatively, the ATCF/ATGW may further initiate the access transfer procedure. The access transfer procedure is performed on the basis that the UE is capable of performing a normal VOIP voice service with the peer UE. Therefore, the speed of the access transfer procedure does not affect the continuity of the voice service of the UE. Specifically, for the process of initiating the access transfer by the ATCF/ATGW, reference may be made to FIG. 5. It should be noted that if the UE does not perform the IMS registration procedure in the pre-registration procedure performed by the UE in the PS domain network, the UE needs to perform IMS registration in the PS domain network first before the ATCF/ATGW initiates the access transfer procedure.

After the access transfer procedure is completed, the UE may perform voice data communication with the peer UE by using new voice bearer paths established in the access transfer process, that is, perform the voice service with the peer UE through the downlink voice bearer path "UE-ENB-SGW-PGW-ATGW-Peer UE" and the uplink voice bearer path "Peer UE-ATGW-PGW-SGW-ENB-UE". In this manner, the rSVCC MSC may control release of the resources occupied by the forwarding channel to actually complete the reverse SRVCC handover procedure. Specifically, the resource releasing process may be initiated by the ATCF.

In addition, in this embodiment, it should further be noted that if the UE does not pre-establish the reserved VOIP voice bearer with the SCC AS in step 315 in the pre-registration procedure in the PS domain network, that is, the UE does not establish the reserved VOIP voice bearer before the reverse SRVCC handover process, in this embodiment, after the RNS/BSS sends the handover request to the MSC in step 702, a core network element in the PS domain network is to proactively trigger establishment of a VOIP voice bearer of the UE in the PS domain network. Specifically, the process of establishing the VOIP voice bearer may be triggered immediately after step 702 by the SGSN, the MSC, the ATCF, or another core network element in the PS domain network.

According to the method for processing reverse single radio voice call continuity in this embodiment, before a UE hands over a voice service from a CS domain network to a PS domain network, the UE performs IMS registration and initiates SIP session setup in advance in the PS domain network so that the PS domain network preallocates information about bearer resources for the UE. In the process of handing over, by the UE, the voice service from the CS domain network to the PS domain network, a forwarding channel of voice data is established between an rSRVCC MSC and an ATGW by using information about a reserved bearer, in which the information is preallocated by the PS domain network for the UE and by proactively querying, by the rSRVCC MSC in the CS domain network, related information from an HSS. In this manner, after the UE actually initiates the voice service handover from the CS domain network to the PS domain network and quickly accesses the PS domain network, the UE is capable of quickly transmitting voice data with a peer user equipment through the established forwarding channel without the need of waiting a long time before an access transfer procedure is completed. This ensures good performance of voice service continuity in the reverse SRVCC handover process. Further, the forwarding channel is established on the basis that the UE completes the access to the PS domain network. Therefore, the voice service performed based on the forwarding channel is further capable of achieving good quality of the voice service.

Figure 8:
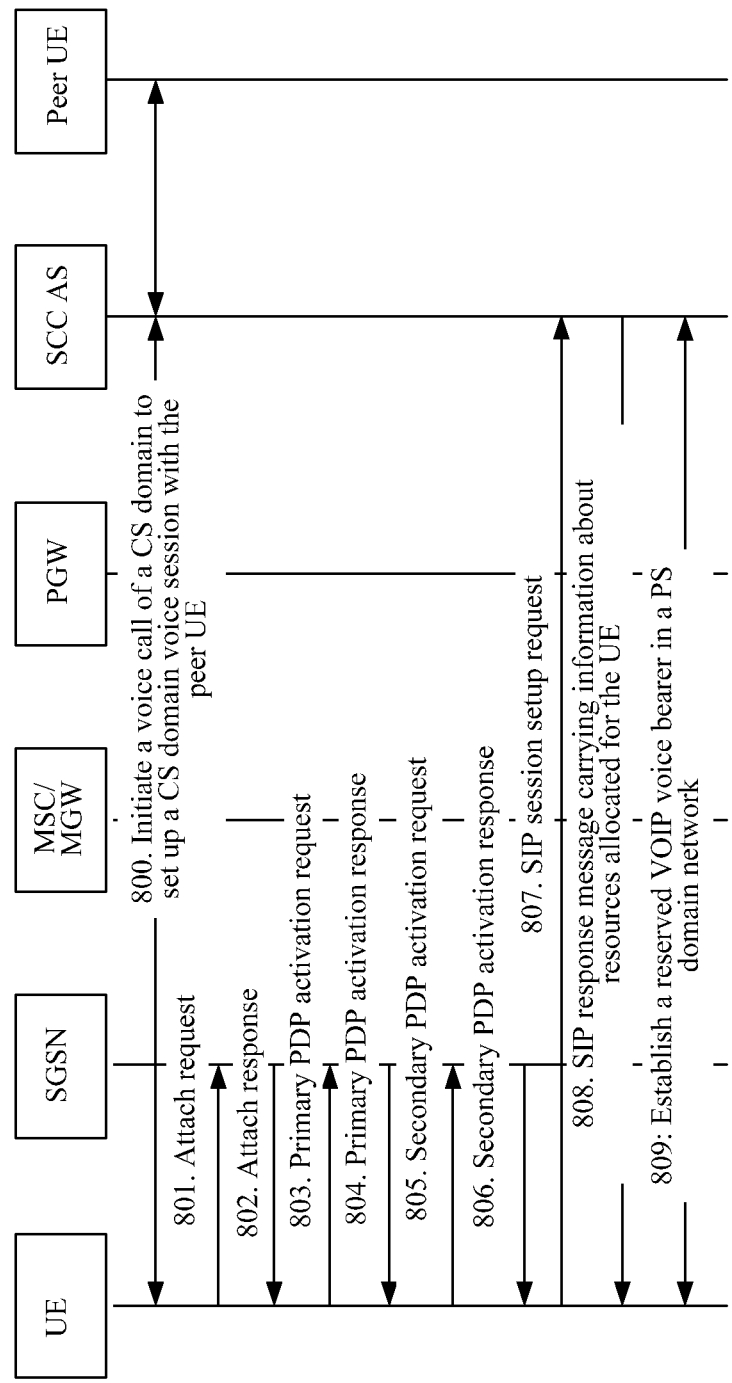
FIG. 8 is another signaling diagram of the procedure in which a user equipment performs IMS registration and sets up a SIP session in a PS domain before initiating a reverse SRVCC handover in a method for processing reverse single radio voice call continuity according to an embodiment of the present invention.

FIG. 8 is another signaling diagram of the procedure in which user equipment performs IMS registration and sets up a SIP session in a PS domain before initiating a reverse SRVCC handover in a method for processing reverse single radio voice call continuity according to an embodiment of the present invention. In the signaling diagram of this embodiment, a UE that supports DTM or UTMS mode and a first network element of the PS domain being a PGW are taken as examples to describe the specific process of performing, by the UE in advance in a PS domain network, IMS registration and SIP session setup. As shown in FIG. 8, in this embodiment, the procedure of performing, by the UE, registration and SIP session setup in the PS domain network before initiating a reverse SRVCC handover procedure specifically includes the following steps:

Step 800: The UE initiates a voice call of a CS domain to set up a CS domain voice session with a peer UE.

In this embodiment, the UE that supports DTM or UTMS mode is taken as an example for description and the UE is capable of supporting a CS domain voice bearer and a PS domain voice bearer at the same time. Therefore, the IMS registration and SIP session setup that are initiated in the PS domain by the UE before the reverse SRVCC handover may be performed on the basis that the UE initiates a voice call of a CS domain and establishes a CS domain voice session with the peer UE.

Specifically, in this embodiment, the performing, by the UE in the PS domain network, the IMS registration and the SIP session setup after completing, according to a regular CS session process, setup of the CS session with the peer UE may specifically be divided into two processes. The first process is that the UE performs, on an SGSN device, the registration in the PS domain network. The process of registration in the PS domain network may specifically include the following steps:

step 801: the UE sends an attach request to an SGSN;
step 802: the SGSN returns an attach response to the UE;
step 803: the UE sends a primary PDP activation request to the SGSN;
step 804: the SGSN returns a primary PDP activation response to the UE;
step 805: the UE sends a secondary PDP activation request to the SGSN; and
step 806: the SGSN returns a secondary PDP activation response to the UE.

Steps 805 and 806 in which the UE performs, on the SGSN, the primary PDP activation procedure are optional. Specifically, in the attach request sent by the UE to the SGSN, the UE may further carry, in the attach request, information about a codec type (CodeC) supported by default in the PS domain network. Based on the CodeC information, the SGSN may learn the codec type supported by the UE in the PS domain network.

Further, alternatively, in the primary PDP activation request or the secondary PDP activation request sent by the UE to the SGSN, the UE may further carry instruction information to instruct the SGSN to acquire, from the PGW of the PS domain network, first information about an IP address/and or a port. Under the instruction of the instruction information, the SGSN instructs the PGW to allocate, for the UE, information about resources that the UE needs in the PS domain network and return the information about resources to the SGSN, where the first information is used for establishing a forwarding channel in the subsequent reverse SRVCC handover process. It should be noted that, in the first information, the information about the port allocated by the PGW for the UE may be a public port dedicated to establishing the forwarding channel in the reverse SRVCC handover. If the port is a dedicated public port, the information about the port allocated by the PGW for the UE may be directly configured on an MME or an rSRVCC MSC.

After the UE completes the registration in the PS domain network on the SGSN, the UE may further perform IMS registration on the SCC AS based on the registered information. In the IMS registration process, the SCC AS may allocate unique STN-SR information for the UE. After completing the IMS registration process, the UE may further initiate a SIP session setup process on the SCC AS. Specifically, the SIP session setup process may specifically include the following steps:

Step 807: The UE sends a SIP session setup request to the SCC AS.

Step 808: The SCC AS returns a SIP response message to the UE, carrying the information about resources allocated for the UE.

After the UE completes the PS domain registration on the SGSN, the UE may further initiate the SIP session setup process to the SCC AS, and pre-establish a reserved SIP session connection in the PS domain network through the process of setting up the SIP session with the SCC AS. Specifically, the initiating, by the UE, the SIP session setup request does not aim to actually set up a SIP session with the peer UE. The pre-established SIP session connection may not actually function before the UE initiates a voice service handover from the CS domain network to the PS domain network, and may be used only for allocating corresponding resources for the UE in a core network of the PS domain network and does not transmit any data. However, once the UE initiates the reverse SRVCC handover process of the voice service, in the reverse SRVCC handover process, the UE may quickly hand over the voice service to VOIP voice of the PS domain based on the preallocated resources and perform a subsequent access transfer procedure for the voice service. In this manner, a SIP session does not need to be initiated to establish a VOIP voice bearer temporarily in the subsequent access transfer process, which is equal to accelerating the subsequent access transfer procedure.

Therefore, the UE may carry reverse SRVCC indication information in the SIP session setup request sent by the UE to the SCC AS, where the reverse SRVCC indication information is used to indicate to the SCC AS that the currently established SIP session is used in the subsequent reverse SRVCC handover procedure, thereby indicating that the SCC AS does not need to initiate an actual voice call to the peer UE when setting up the SIP session for the UE according to the SIP session setup message, and does not proactively trigger the process of releasing information about resources of the UE even when no data is transmitted on the reserved SIP session connection for a long period of time. In the actual application, the carrying, by the UE, the reverse SRVCC indication information in the SIP session setup request sent to the SCC AS may specifically be implemented in the following two manners: the UE may carry a piece of indication information separately in the SIP session setup request, for example, rSRVCC indicator information; or the UE may also carry a special called number in the SIP session setup request sent to the SCC AS so that when receiving the SIP session setup request that carries the called number, the SCC AS learns that the SIP session is used in the reverse SRVCC handover.

Further, preferably, in the process of sending, by the UE, the SIP session setup request to the SCC AS through the SGSN, the UE may further send another piece of indication information to the SGSN besides finally sending the reverse SRVCC indication information to the SCC AS. The indication information is used to indicate that the SGSN does not initiate an RAB establishment process after the SIP session is set up in the PS domain network for the UE. Before the reverse SRVCC handover, the actual function of establishing the SIP session connection for the UE is preparing for the subsequent reverse SRVCC handover process. Before the reverse SRVCC handover process is performed, the SIP session connection does not transmit any voice data of the UE. Therefore, accordingly, the SGSN does not need to initiate an actual RAB establishment process, thereby avoiding a waste of resources. Specifically, for the method for the UE to send the indication information to the SGSN, reference may be made to the description in the preceding embodiment and no further description is provided here.

In addition, it should further be noted that if the UE does not report its supported CodeC information in the PS domain network to the SGSN in the procedure for attaching to the SGSN, alternatively, in the signaling interaction process of setting up the SIP session by the UE and the SCC AS in this step, the UE may further negotiate, with the SCC AS, the CodeC information of the UE in the PS domain network. After the negotiation is successful, the SCC AS carries the negotiated CodeC information in a SIP response message and returns the SIP response message to the UE. In addition, information used for identifying, for example, a destination IP address of service sending of the UE in the PS domain network, may also be negotiated by the UE and the SCC AS in the signaling interaction process, and the negotiated IP address information is carried by the SCC AS in the SIP response message and returned to the UE together with the CodeC information.

Step 809: The UE establishes a reserved VOIP voice bearer in the PS domain network.

Further, after the UE establishes the SIP session on the SCC AS, alternatively, the UE may further pre-establish, in the PS domain network, the reserved VOIP voice bearer with the SCC AS for bearing a VOIP voice service of the UE. That is, information about a reserved bearer used for the VOIP voice service is further allocated for the UE in a core network element of the PS domain network. The reserved VOIP voice bearer that is pre-established is used in the subsequent reverse SRVCC handover process and is in suspended state before the handover. By pre-establishing the suspended VOIP voice bearer, the UE does not need to establish a VOIP voice bearer temporarily when the UE actually initiates the reverse SRVCC handover process, thereby accelerating the voice service handover to the PS domain network.

In addition, it should be noted that, in the process of performing, by the UE, registration in the PS domain network in this embodiment, if the UE does not support DTM mode, that is, the voice service of the UE cannot be borne in the CS domain and the PS domain at the same time, in the preceding step, the IMS registration performed by the UE in the PS domain network needs to be completed before the UE sets up the CS domain voice session in the CS domain network. That is, needed resources are allocated for the UE in the PS domain network first, and then the UE sets up a normal voice session in the CS domain network. The voice service is borne in the CS domain network and the situation that registration of a new voice service affects a voice service in the original CS domain network is avoided.

Figure 9:
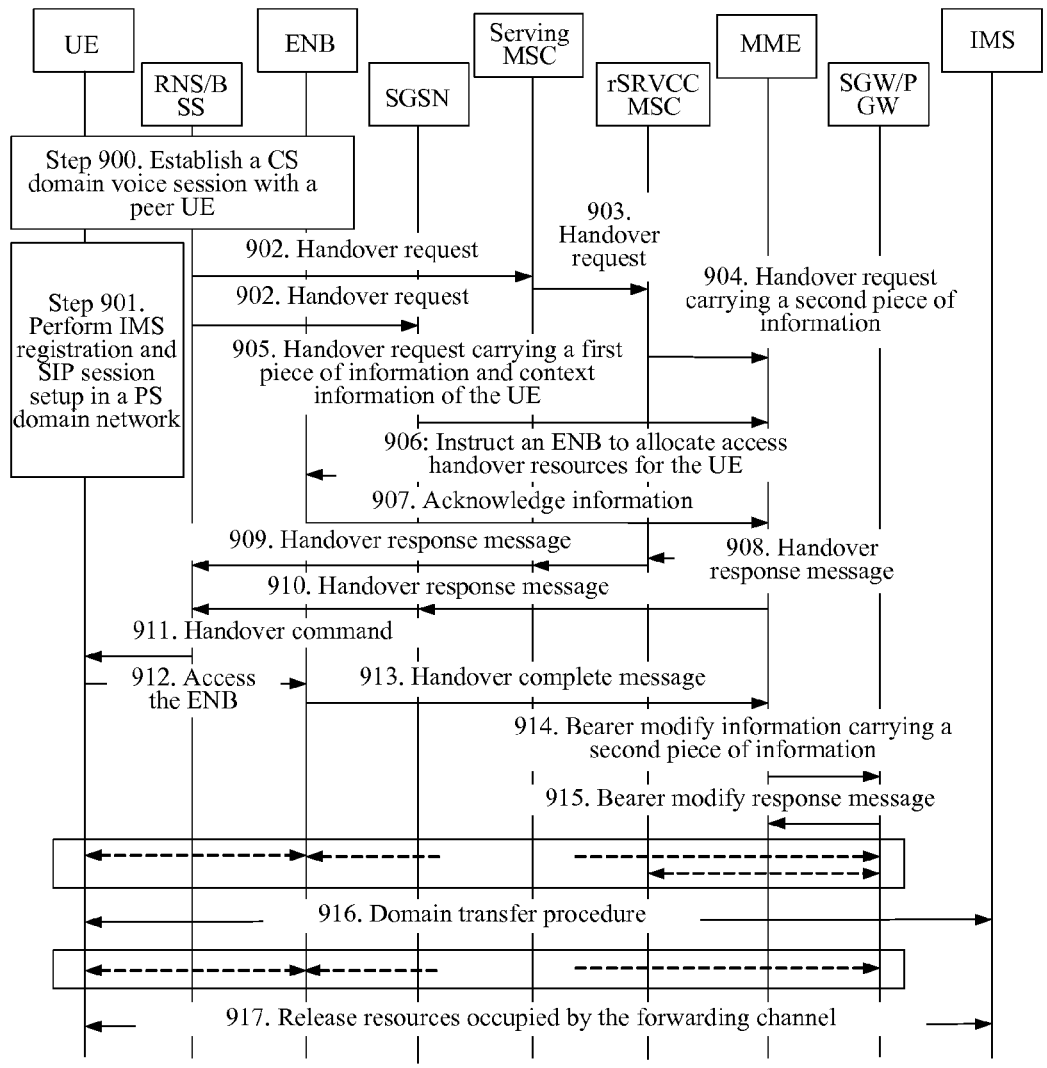
FIG. 9 is a signaling diagram of a method for processing reverse single radio voice call continuity according to a sixth embodiment of the present invention.

FIG. 9 is a signaling diagram of a method for processing reverse single radio voice call continuity according to Embodiment 6 of the present invention. In this embodiment, a UE that supports DTM or UTMS mode and a first network element of a PS domain being a PGW are taken as examples to describe the specific process of a reverse SRVCC handover performed by the UE. As shown in FIG. 9, the method includes the following steps.

Step 900: The UE initiates a voice call of a CS domain to set up a CS domain voice session with a peer UE.

Step 901: The UE performs registration and sets up a SIP session in a PS domain network so that the PS domain network preallocates information about resources for the UE.

For the specific process of the preceding step, reference may be made to the specific description of the preceding signaling diagram. Before performing the reverse SRVCC handover, the UE performs registration and establishes a SIP session connection in advance in the PS domain network so that the PS domain network preallocates information about reserved resources for the UE. Further, based on the preallocated information about resources, the UE may further pre-establish a reserved VOIP voice bearer in the PS domain network for a voice service.

Step 902: An RNS/BSS sends a handover request to a serving MSC and an SGSN at the same time.

In this embodiment, it is assumed that the UE supports DTM or UTMS mode, that is, supports the two types of voice bearers at the same time. Therefore, in the process of initiating, by the RNS/BSS, the reverse SRVCC handover, the RNS/BSS needs to hand over the two types of bearers at the same time, which specifically refers to that handovers of a CS voice service and a PS voice service are performed at the same time. Therefore, in this step, the RNS/BSS needs to send the handover request to the MSC and the SGSN at the same time. It should be noted that if in this embodiment, the UE does not support DTM mode, in this step, the RNS/BSS only needs to send the handover request to the MSC.

Step 903: The serving MSC forwards the handover request to an rSRVCC MSC.

Step 904: The rSRVCC MSC allocates second information for the UE, where the second piece of information is carried in the handover request and forwarded to an MME.

In this embodiment, after receiving the handover request of the RNS/BSS, the serving MSC forwards the handover request to the rSRVCC MSC to instruct the rSRVCC MSC to allocate, for the UE, the second information about an IP address and/or a port. In this manner, the rSRVCC MSC learns, according to the handover request that the UE needs to hand over the voice service to the PS domain network at present. Therefore, the rSRVCC MSC responds to the handover request, allocates the IP address and/or port information for the UE, carries the allocated second information about the IP address and/or port in the handover request, and forwards the handover request to the MME.

Step 905: The SGSN carries first information preallocated by the PGW and context information of the UE in the handover request, and forwards the handover request to the MME.

After receiving the handover request of the RNS/RSS, the SGSN forwards the handover request to the MME. In addition, the SGSN further carries, in the handover request, the first information about the IP address and/or port acquired from the first network element PGW and the context information, for example, STN-SR and CodeC information, registered in the PS domain network by the UE in the IMS registration process that is performed in advance by the UE in the PS domain network, and then forwards the handover request to the MME.

It should be noted that if in this embodiment, the UE does not support DTM or UMTS node, in this step, the SGSN cannot proactively forward the first information and the context information of the UE to the MME when not receiving the handover request sent by the RNS/BSS. In this case, the MME sends, to an HSS, a location update request or another request message carrying the identifier of the UE, so as to acquire the preceding information from the SGSN. In this manner, the HSS is capable of finding the identifier of the corresponding SGSN according to the identifier of the UE in the location update request and returning the identifier of the SGSN to the MME. Then, the MME acquires, from the corresponding SGSN, the context information of the UE and the first information.

Step 906: The MME instructs an ENB to allocate access handover resources for the UE.

Step 907: The ENB sends acknowledge information to the MME to acknowledge that allocation of the access handover resources is completed.

In this situation, in order to enable the UE to access the PS domain network and complete the access operation in the PS domain network, the MME may instruct the ENB in the PS domain network to prepare access handover resources for the UE. After the resource allocation is completed, the ENB sends an acknowledge message to the MME to notify that the allocation of the access handover resources prepared for the UE is completed.

Step 908: The MME sends a handover response message to the rSRVCC MSC, where the handover response message carries the first information allocated by the PGW and the context information of the UE.

After learning that the ENB completes the allocation of the access handover resources for the UE, the MME returns the handover response message to the MGW, where the handover response message carries the first bearer information that is allocated by the PGW to a forwarding channel and the CodeC information registered in the PS domain network by the UE in the pre-registration process, which are acquired from the SGSN in step 905, so as to forward the first information that is allocated by the PGW to the second network element rSRVCC MSC, which is equal to notifying the rSRVCC MSC of the IP address and/or port information of the first network element PGW. In this manner, when receiving uplink voice data sent by the peer UE to the UE, the rSRVCC MSC may accurately transmit the uplink voice data to the first network element PGW according to the IP address and/or port information, so as to transmit the uplink voice data to the UE. In addition, the rSRVCC MSC is also capable of performing, based on the CodeC information registered in the PS domain network by the UE, a corresponding encoding operation on the uplink voice data before forwarding the uplink voice data of the UE to the PGW, and then forwarding the encoded uplink voice data to the UE.

Step 909: The rSRVCC MSC returns the handover response message to the RNS/BSS through the serving MSC.

After receiving the handover response message sent by the MME, the rSRVCC MSC stores the bearer information carried in the message, and further, the rSRVCC MSC forwards the handover response message to the RNS/BSS through the serving MSC to complete the procedure of CS voice handover to the PS domain.

Step 910: The MME returns the handover response message to the RNS/BSS through the SGSN.

At the same time, after step 407, the MME further returns the handover response message to the SGSN after learning that the ENB completes the allocation of the access handover resources for the UE, so that the SGSN forwards the handover response message to the RNS/BSS to notify the RNS/BSS that access handover resource information has been allocated in the ENB for the UE.

Step 911: The RNS/BSS sends a handover command to the UE.

Step 912: The UE accesses the ENB.

Step 913: The ENB sends a handover complete message to the MME.

After receiving the handover response message, the RNS/BSS sends the handover command to the UE to instruct the UE to perform the operation of accessing the PS domain network. In this manner, by using the access handover resources allocated by the ENB for the UE, the UE successfully accesses the ENB, that is, accesses the PS domain network, and completes the network access procedure. After the procedure of access of the UE to the ENB is completed, the ENB sends the handover complete message to the MME to notify the MME that the access to the PS domain network is completed.

Step 914: The MME sends a bearer modify request to the PGW, carrying the second information allocated by the rSRVCC MSC for the UE.

Step 915: The PGW returns a bearer modify response message to the MME.

After receiving the handover complete message, the MME sends the bearer modify request to the first network element PGW in the PS domain network, where the bearer modify request carries the second information acquired from the second network element rSRVCC MSC in step 904, that is, the MME enables, on the PGW, a bearer path for the voice service of the UE to point to the rSRVCC MSC and forwards, to the PGW, the IP address and/or port information allocated by the rSRVCC MSC for the UE. In this manner, the PGW enables the voice bearer path, which should originally point to the peer UE, to point to the rSRVCC MSC, thereby establishing a forwarding channel between the PGW and the rSRVCC MSC. Therefore, when receiving, through the ENB, downlink voice data sent by the UE to the peer UE, the PGW is capable of accurately forwarding the downlink voice data to the rSRVCC MSC and then sending to the peer UE according to the IP address and/or port information allocated by the rSRVCC MSC for the VOIP voice bearer of the UE. Further, based on the CodeC information that is registered in the PS domain network by the UE and acquired by the rSRVCC MSC in step 908, after receiving the downlink voice data of the UE forwarded by the PGW, the rSRVCC MSC is also capable of performing a corresponding decoding operation on the downlink voice data before sending the downlink voice data to the peer UE, and then forwarding the decoded downlink voice data to the peer UE.

By now, new voice bearer paths are established between the UE and the peer UE. Downlink voice data sent by the UE to the peer UE may be sent to the peer UE through the downlink voice bearer path "UE-ENB-SGW-PGW-rSRVCC MSC-Serving MSC-Peer UE", and uplink voice data sent by the peer UE to the UE may be sent to the UE through the reverse bearer path "Peer UE-Serving MSC-rSVCC MSC-PGW-SGW-ENB-UE" (as shown by the dashed lines below step 915 in FIG. 9). In this manner, even before an access transfer procedure is started or when the access transfer procedure is not completed, the UE and the peer UE are also capable of performing voice data communication through the bearer paths without the need of interrupting the voice service, thereby ensuring good continuity of the voice service. Further, the bearer paths are established on the basis that the UE completes the access to the PS domain network. Therefore, the voice service based on the current UE is further capable of achieving good quality of the voice service.

In addition, it should be noted that the UE may be classified into two types: the type supporting DTM or UTMS mode and the type not supporting DTM or UTMS mode. Although a UE that supports DTM or UTMS is taken as an example in this embodiment to describe the reverse SRVCC handover process, it should be understood that if the UE does not support DTM or UTMS mode, the difference between the reverse SRVCC handover process in this embodiment and that when the UE supports DTM mode lies is explained now.

If the UE does not support DTM or UTMS mode, the IMS registration process performed by the UE in the PS domain before the handover needs to be completed before the UE sets up the CS domain voice session with the peer UE in the CS domain network; in the reverse SRVCC handover process, because the UE cannot support the two types of voice bearers at the same time, in step 902, the RNS/BSS only needs to send the handover request to the serving MSC and does not need to send the handover request to the SGSN and the serving MSC at the same time. In this situation, because the SGSN does not receive the handover request sent by the RNS/BSS, the SGSN cannot carry, in the handover request, the first information allocated by the PGW and the context information registered in the PS domain network by the UE and then forward the handover request to the MME. In this case, the MME further needs to send the location update request or another request message to the HSS to acquire, from the HSS by using the location update request, the SGSN that stores information such as the first information, thereby proactively acquiring, from the corresponding SGSN, the first information allocated by the PGW and the context information registered in the PS domain network by the UE.

Step 916: The UE initiates the access transfer procedure.

Step 917: After the access transfer procedure is completed, release resources occupied by the forwarding channel.

After the bearer paths are successfully established and the UE is capable of performing voice data communication with the peer UE through the bearer paths, in this embodiment, in order to actually hand over the voice service between the UE and the peer UE to the PS domain network, alternatively, the UE may further initiate the access transfer procedure. The access transfer procedure is performed on the basis that the UE is capable of performing a normal VOIP voice service with the peer UE. Therefore, the speed of the access transfer procedure does not affect the continuity of the voice service of the UE. It should be noted that if the UE does not perform the IMS registration procedure in the pre-registration process performed by the UE in the PS domain network, the UE needs to perform IMS registration in the PS domain network first before the UE initiates the access transfer procedure.

After the access transfer procedure is completed, the UE may perform voice data communication with the peer UE by using new voice bearer paths established in the access transfer process, that is, perform the voice service with the peer UE through the downlink voice bearer path "UE-ENB-SGW-PGW-Peer UE" and the uplink voice bearer path "Peer UE-PGW-SGW-ENB-UE" (as shown by the dashed lines below step 916 in FIG. 9). In this manner, the SCC AS may control release of the resources occupied by the forwarding channel to actually complete the reverse SRVCC handover procedure. Specifically, the resource releasing process may be initiated by an interworking solution function (Interworking Solution Function, IWS). The IWS sends resource release indication information to the MME through the MSC so that the MME controls release of all resources of the VOIP bearer.

According to the method for processing reverse single radio voice call continuity in this embodiment, before a UE hands over a voice service from a CS domain network to a PS domain network, the UE performs IMS registration and initiates SIP session setup in advance in the PS domain network so that the PS domain network preallocates information about bearer resources for the UE. In the process of handing over, by the UE, the voice service from the CS domain network to the PS domain network, the MME controls establishment of a forwarding channel between an rSRVCC MSC and a PGW by using information about a reserved bearer, in which the information is preallocated by the PS domain network for the UE. In this manner, after the UE actually initiates the voice service handover from the CS domain network to the PS domain network and quickly accesses the PS domain network, the UE is capable of quickly transmitting voice data with a peer user equipment through the established forwarding channel without the need of waiting a long time before an access transfer procedure is completed. This ensures good performance of voice service continuity in the reverse SRVCC handover process. Further, the forwarding channel is established on the basis that the UE completes the access to the PS domain network. Therefore, the voice service performed based on the forwarding channel is further capable of achieving good quality of the voice service.

Persons skilled in the art should understand that all or a part of the steps of the methods in the embodiments may be implemented by a program instructing relevant hardware. The program may be stored in a computer readable storage medium. When the program is run, the processes of the methods in the embodiments are performed. The storage medium includes: any medium that may store program codes, such as a ROM, a RAM, a magnetic disk, or an optical disk.

Figure 10:
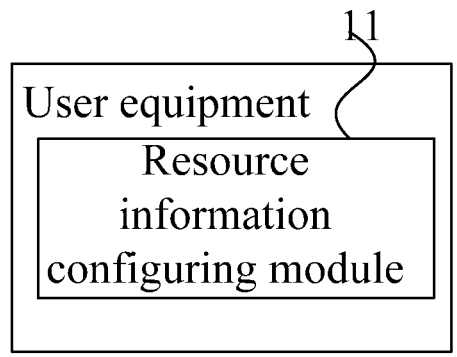
FIG. 10 is a schematic structural diagram of a user equipment according to Embodiment 1 of the present invention.

FIG. 10 is a schematic structural diagram of a user equipment according to Embodiment 1 of the present invention. As shown in FIG. 10, the user equipment in this embodiment includes at least a resource information configuring module 11. Specifically, the resource information configuring module 11 is configured to: before the user equipment hands over a voice service from a CS domain network to a PS domain network, preconfigure, in the PS domain network, information about resources that the voice service handover needs, where the information about resources may be used in the process of handing over, by the user equipment, the voice service from the CS domain network to the PS domain network. Specifically, a forwarding channel can be established between a first network element of the PS domain network and a second network element of the CS domain network by using the preconfigured information about resources, where the forwarding channel is configured to forward voice service data between the user equipment and a peer user equipment after the user equipment accesses the PS domain network.

Specifically, for specific work processes of all modules in this embodiment, reference may be made to related content disclosed in related embodiments involving the method for processing reverse single radio voice call continuity. No further description is provided here.

Before the user equipment in this embodiment hands over a voice service from a CS domain network to a PS domain network, information about bearer resources is preallocated for the UE in the PS domain network. Thereby, in the process of handing over the voice service from the CS domain network to the PS domain network, a forwarding channel of voice data is pre-established between the CS domain network and the PS domain network by using information about a reserved bearer, in which the information is preallocated by the PS domain network for the UE. In this manner, after the UE actually initiates the voice service handover from the CS domain network to the PS domain network and quickly accesses the PS domain network, the UE is capable of quickly transmitting voice data with a peer user equipment through the forwarding channel without the need of waiting a long time before an access transfer procedure is completed. This ensures good performance of voice service continuity in the reverse SRVCC handover process. Further, the forwarding channel is established on the basis that the UE completes the access to the PS domain network. Therefore, the voice service performed based on the forwarding channel is further capable of achieving good quality of the voice service.

Figure 11:
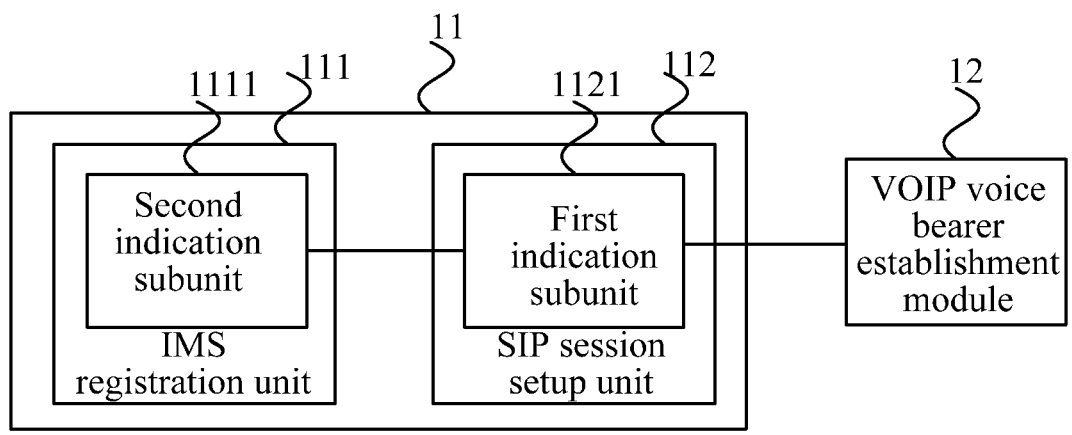
FIG. 11 is a schematic structural diagram of a user equipment according to Embodiment 2 of the present invention.

FIG. 11 is a schematic structural diagram of a user equipment according to Embodiment 2 of the present invention. Specifically, in this embodiment, a first network element in a PS domain network may specifically be a PGW or an ATGW, and a second network element in a CS domain network may specifically be an rSRVCC MSC.

As shown in FIG. 11, based on the preceding embodiment, in the user equipment in this embodiment, alternatively, the resource information configuring module may specifically include an IMS registration unit 111 and a SIP session setup unit 112. The IMS registration unit 111 is configured to perform IMS registration in the PS domain network before the user equipment hands over a voice service from the CS domain network to the PS domain network; and the SIP session setup unit 112 is configured to set up a SIP session in the PS domain network before the user equipment hands over the voice service from the CS domain network to the PS domain network.

Specifically, the SIP session setup unit 112 may further includes a first indication subunit 1121, where the first indication subunit 1121 is configured to send rSRVCC indicator information to an SCC AS in the SIP session setup procedure performed by the SIP session setup module 112, where the rSRVCC indicator information is used to indicate to the SCC AS that the SIP session set up currently is used in a reverse SRVCC service handover, and therefore the SCC AS does not need to initiate a voice call to a peer user equipment, nor proactively trigger a procedure of releasing the preconfigured information about resources.

Further, alternatively, in the user equipment in this embodiment, the IMS registration unit 111 may further include a second indication subunit 1111, where the second indication subunit 1111 is configured to send indication information to an SGSN in the IMS registration procedure performed by the IMS registration module 111, where the indication information is used to indicate that the SGSN does not need to initiate an RAB establishment process before the user equipment initiates the voice service handover from the CS domain network to the PS domain network.

Further, in this embodiment, the user equipment may include a VOIP voice bearer establishment module 12, where the VOIP voice bearer establishment module 12 is configured to pre-establish, in the PS domain network, a reserved VOIP voice bearer for the voice service handover after the SIP session setup unit 112 performs the SIP session setup procedure and before the user equipment initiates the voice service handover from the CS domain network to the PS domain network; or the VOIP voice bearer establishment module 12 is configured to establish, in the PS domain network, a VOIP voice bearer for the voice service handover after the user equipment initiates the voice service handover from the CS domain network to the PS domain network.

Specifically, for the specific work processes of all modules in this embodiment, reference may be made to related content disclosed in related embodiments involving the method for processing reverse single radio voice call continuity. No further description is provided here.

The user equipment in this embodiment performs in advance IMS registration in the PS domain network before handing over a voice service from a CS domain network to a PS domain network domain so that the PS domain network preallocates bearer resources for the UE. In the process of handing over the voice service from the CS domain network to the PS domain network, a forwarding channel is pre-established between the CS domain network and the PS domain network by using information about a reserved bearer, in which the information is preallocated by the PS domain network for the UE. In this manner, after the UE actually initiates the voice service handover from the CS domain network to the PS domain network and quickly accesses the PS domain network, the UE is capable of quickly transmitting voice data with a peer user equipment through the forwarding channel without the need of waiting a long time before an access transfer procedure is completed. This ensures good performance of voice service continuity in the reverse SRVCC handover process. Further, the forwarding channel is established on the basis that the UE completes the access to the PS domain network. Therefore, the voice service performed based on the forwarding channel is further capable of achieving good quality of the voice service.

Figure 12:
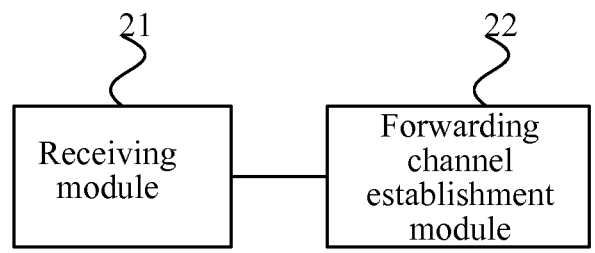
FIG. 12 is a schematic structural diagram of a mobility management entity according to Embodiment 1 of the present invention.

FIG. 12 is a schematic structural diagram of a mobility management entity according to Embodiment 1 of the present invention. As shown in FIG. 12, the mobility management entity in this embodiment includes at least two modules: a receiving module 21 and a forwarding channel establishment module 22. The receiving module 21 is configured to receive a handover request, where the handover request is used to request a handover of a voice service of a UE from a CS domain network to a PS domain network; and the forwarding channel establishment module 22 is configured to: in the process of handing over, by the UE, the voice service from the CS domain network to the PS domain network, control establishment of a forwarding channel between a first network element of the PS domain network and a second network element of the CS domain network by using information about resources that the voice service handover needs, where the information is preconfigured by the UE in the PS domain network. Specifically, the forwarding channel established under the control of the forwarding channel establishment module 22 is configured to forward voice service data between the UE and a peer UE after the UE accesses the PS domain network.

Specifically, for the specific work processes of all modules in this embodiment, reference may be made to related content disclosed in related embodiments involving the method for processing reverse single radio voice call continuity. No further description is provided here.

The mobility management entity in this embodiment controls, in the process of handing over, by a UE, a voice service from a CS domain network to a PS domain network, establishment of a forwarding channel of voice data between the CS domain network and the PS domain network using information about resources that is preconfigured by the UE in the PS domain network before handing over the voice service from the CS domain to the PS domain. In this manner, after the UE actually initiates the voice service handover from the CS domain network to the PS domain network and quickly accesses the PS domain network, the UE is capable of quickly transmitting voice data with a peer user equipment through the forwarding channel without the need of waiting a long time before an access transfer procedure is completed. This ensures good performance of voice service continuity in the reverse SRVCC handover procedure. Further, the forwarding channel is established on the basis that the UE completes the access to the PS domain network. Therefore, the voice service performed based on the forwarding channel is further capable of achieving good quality of the voice service.

Figure 13:
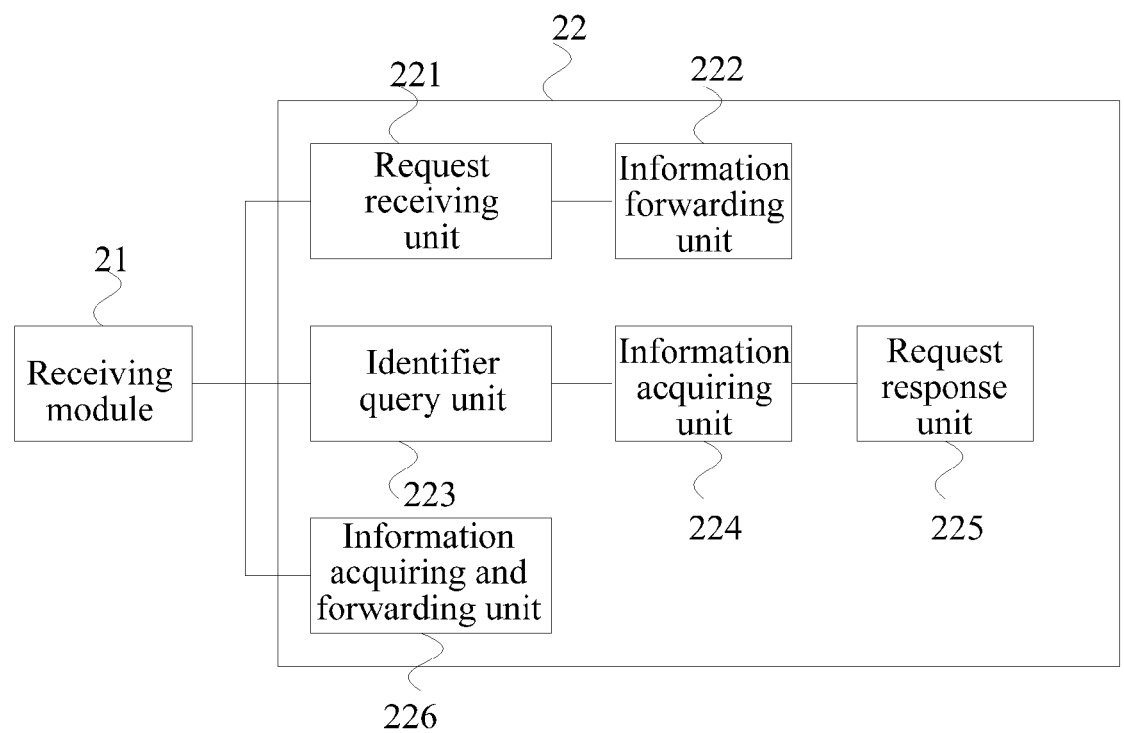
FIG. 13 is a schematic structural diagram of a mobility management entity according to Embodiment 2 of the present invention.

FIG. 13 is a schematic structural diagram of a mobility management entity according to Embodiment 2 of the present invention. Specifically, in this embodiment, a first network element in a PS domain network may specifically be an ATGW or a PGW, and a second network element in a CS domain network may specifically be an rSRVCC MSC. Information about resources that is preconfigured by a UE in the PS domain network using an IMS registration procedure and a SIP session setup procedure may include at least context information pre-registered in the PS domain network by the UE, where the context information includes at least STN-SR information.

On this basis, when the first network element is the ATGW and the UE supports DTM or UMTS mode, the forwarding channel establishment module 22 may further specifically include two subunits: a request receiving unit 221 and an information forwarding unit 222. The request receiving unit 221 is configured to receive a handover request forwarded by an SGSN, where the handover request carries the context information pre-registered by the UE; and the information forwarding unit 222 is configured to forward the context information to the rSRVCC MSC so that the rSRVCC MSC addresses to a corresponding ATGW according to the STN-SR information of the UE, and establishes a forwarding channel with the corresponding ATGW.

Further, when the first network element is the ATGW and the UE does not support DTM or UMTS mode, the forwarding channel establishment module 22 may further specifically include three subunits: an identifier query unit 223, an information acquiring unit 224, and a request response unit 225. Specifically, the identifier query unit 223 is configured to query in an HSS, according to the received handover request forwarded by the rSRVCC MSC, the identifier of an SGSN corresponding to the UE; the information acquiring unit 224 is configured to acquire, from the specified SGSN and according to the identifier of the SGSN found by the identifier query unit 223, the context information pre-registered by the UE; and the request response unit 225 is configured to carry, in a handover response message, the STN-SR information in the context information acquired by the information acquiring unit 224, and return the handover response message to the rSRVCC MSC so that the rSRVCC MSC addresses to a corresponding ATGW according to the STN-SR information and establish a forwarding channel with the corresponding ATGW.

Further, when the first network element is a PGW, in this embodiment, the forwarding channel establishment module 22 may further specifically include an information acquiring and forwarding unit 226. The information acquiring and forwarding unit 226 is configured to acquire, from the PGW and the rSRVCC MSC respectively, IP address and/or port information allocated by the PGW and the rSRVCC MSC to the UE, and enable the respectively acquired IP address and/or port information to be exchanged between the PGW and the rSRVCC MSC so that a forwarding channel is established between the PGW and the rSRVCC MSC.

Specifically, for the specific work processes of all modules in this embodiment, reference may be made to related content disclosed in related embodiments involving the method for processing reverse single radio voice call continuity. No further description is provided here.

The mobility management entity controls, in the process of handing over, by a UE, a voice service from a CS domain network to a PS domain network, establishment of a forwarding channel of voice data between the CS domain network and the PS domain network by using information about resources that is configured by the UE that performs IMS registration in the PS domain network before handing over the voice service from the CS domain network to the PS domain network. In this manner, after the UE actually initiates the voice service handover from the CS domain network to the PS domain network and quickly accesses the PS domain network, the UE is capable of quickly transmitting voice data with a peer user equipment through the forwarding channel without the need of waiting a long time before an access transfer procedure is completed. This ensures good performance of voice service continuity in the reverse SRVCC handover procedure. Further, the forwarding channel is established on the basis that the UE completes the access to the PS domain network. Therefore, the voice service performed based on the forwarding channel is further capable of achieving good quality of the voice service.

Figure 14:
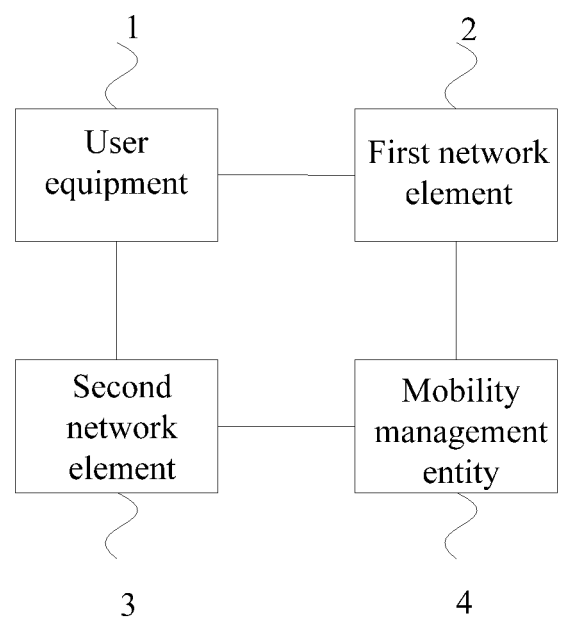
FIG. 14 is a schematic structural diagram of a system for processing reverse single radio voice call continuity according to an embodiment of the present invention.

FIG. 14 is a schematic structural diagram of a system for processing reverse single radio voice call continuity according to an embodiment of the present invention. As shown in FIG. 14, the system for processing reverse single radio voice call continuity in this embodiment includes at least a user equipment 1, a first network element 2, and a second network element 3.

Specifically, the user equipment 1 is used to preconfigure, in a PS domain network, information about resources before handing over a voice service from a CS domain network to a PS domain network; the first network element 2 is located in the PS domain network, the second network element 3 is located in the CS domain network, the first network element 2 may specifically be a PGW or ATGW device in the PS domain network, and the second network element 3 may specifically be an rSRVCC MSC device in the CS domain network. In the process of handing over, by the user equipment 1, the voice service from the CS domain network to the PS domain network, a forwarding channel may be established between the first network element 2 and the second network element 3 by using the information about resources that is preconfigured by the user equipment 1, where the forwarding channel is configured to forward voice service data between the user equipment 1 and a peer user equipment after the user equipment 1 accesses the PS domain network.

Specifically, for all modules included in the user equipment and specific work processes of the included modules in this embodiment, reference may be made to related content disclosed in related embodiments involving the method for processing reverse single radio voice call continuity, the user equipment, and the mobility management entity. No further description is provided here.

According to the system for processing reverse single radio voice call continuity in this embodiment, before a UE hands over a voice service from a CS domain network to a PS domain network, the UE performs IMS registration and initiates SIP session setup in advance in the PS domain network so that the PS domain network preallocates information about bearer resources for the UE. In the process of handing over, by the UE, the voice service from the CS domain network to the PS domain network, a forwarding channel of voice data is established between the CS domain network and the PS domain network by using information about a reserved bearer, in which the information is preallocated by the PS domain network for the UE. In this manner, after the UE actually initiates the voice service handover from the CS domain network to the PS domain network and quickly accesses the PS domain network, the UE is capable of quickly transmitting voice data with a peer user equipment through the established forwarding channel without the need of waiting a long time before an access transfer procedure is completed. This ensures good performance of voice service continuity in the reverse SRVCC handover procedure. Further, the forwarding channel is established on the basis that the UE completes the access to the PS domain network. Therefore, the voice service performed based on the forwarding channel is further capable of achieving good quality of the voice service.

Further, based on the preceding technical solutions, the system for processing reverse single radio voice call continuity in this embodiment may further include a mobility management entity 4. The mobility management entity 4 is configured to: in the process of handing over, by the user equipment 1, the voice service from the CS domain network to the PS domain network, control establishment of the forwarding channel between the first network element 2 and the second network element 3 by using the information about resources that is preconfigured by the user equipment 1. Specifically, for all modules included in the mobility management entity and specific work processes of the included modules in this embodiment, reference may be made to related content disclosed in related embodiments involving the method for processing reverse single radio voice call continuity, the user equipment, and the mobility management entity. No further description is provided here.

Finally, it should be noted that the embodiments of the present invention are intended for describing the technical solutions of the present invention other than limiting the present invention. Although the present invention is described in detail with reference to the foregoing embodiments, persons skilled in the art should understand that they may still make modifications to the technical solutions described in the foregoing embodiments or make equivalent substitutions to some technical features thereof, without departing from the spirit and scope of the technical solutions of the embodiments of the present invention.

What is claimed is:

1. A method for processing reverse single radio voice call continuity, comprising:
   during or before handing over a voice service from a circuit switched domain network to a packet switched domain network, performing an IMS registration; and
   in the process of handing over, by the user equipment, the voice service from the circuit switched domain network to the packet switched domain network, establishing a forwarding channel between a first network element of the packet switched domain network and a second network element of the circuit switched domain network, wherein the forwarding channel is configured to transmit voice service data between the user equipment and a peer user equipment after the user equipment accesses the packet switched domain network, and wherein the first network element is an access transfer gateway (ATCF/ATGW) and the second network element is a mobile switching center supporting a reverse single radio voice call continuity (SRVCC) service;
   wherein the establishing the forwarding channel between the first network element of the packet switched domain network and the second network element of the circuit switched domain network uses preconfigured information about resources needed for the handing over and comprises controlling, by a mobility management entity (MME) using the preconfigured information about resources, the establishment of the forwarding channel between the first network element of the packet switched domain network and the second network element of the circuit switched domain network;
   wherein the controlling the establishment of the forwarding channel comprises the second network element forwarding a handover request to the MME; and
   wherein the preconfigured information about resources comprises at least context information that is pre-registered in the packet switched domain network by the user equipment, and the context information comprises at least information about a session transfer number for the reverse voice call continuity service (STN-SR).

2. The method for processing reverse single radio voice call continuity according to claim 1,
   wherein, if the user equipment supports dual transfer mode (DTM) or universal mobile telecommunications system (UMTS) mode, the controlling, by an MME by using the preconfigured information about resources, establishment of the forwarding channel between the first network element of the packet switched domain network and the second network element of the circuit switched domain network comprises:
   receiving, by the MME, a handover request forwarded by a serving general packet radio service (GPRS) support node, wherein the handover request carries the context information pre-registered by the user equipment; and
   forwarding, by the MME, the context information to the mobile switching center so that the mobile switching center addresses to a corresponding ATCF/ATGW according to STN-SR information in the context information, and establishes the forwarding channel with the corresponding ATCF/ATGW.

3. The method for processing reverse single radio voice call continuity according to claim 1,
   if the user equipment does not support dual transfer mode (DTM) or universal mobile telecommunications system (UMTS) mode, the controlling, by an MME by using the preconfigured information about resources, establishment of the forwarding channel between the first network element of the packet switched domain network and the second network element of the circuit switched domain network comprises:
   querying, by the MME and according to a received handover request forwarded by the mobile switching center, for an identifier of a serving general packet radio service (GPRS) support node corresponding to the user equipment in a home subscriber server (HSS);
   acquiring, from a specified serving GPRS support node by the MME and according to the found identifier of the serving GPRS support node, the context information pre-registered by the user equipment; and
   carrying, by the MME, the STN-SR information, which is in the context information, in a handover response message; and returning the handover response message to the mobile switching center so that the mobile switching center addresses to the corresponding ATCF/ATGW according to the STN-SR information in the context information, and establishes the forwarding channel with the corresponding ATCF/ATGW.

4. The method for processing reverse single radio voice call continuity according to claim 1,
if the user equipment does not support dual transfer mode (DTM) or universal mobile telecommunications system (UMTS) mode, the establishing a forwarding channel between a first network element of the packet switched domain network and a second network element of the circuit switched domain network by using the preconfigured information about resources comprises:
querying in a home subscriber server (HSS), by the mobile switching center after receiving a handover request, for an identifier of the a serving general packet radio service (GPRS) support node corresponding to the user equipment;
forwarding, by the mobile switching center and according to the found identifier of the serving GPRS support node, the handover request to the MME through a specified serving GPRS support node, and acquiring, from the specified serving GPRS support node, the context information pre-registered by the user equipment; and
addressing to, by the mobile switching center, a corresponding ATCF/ATGW according to the STN-SR information in the context information, and establishing the forwarding channel with the corresponding ATCF/ATGW.

5. The method for processing reverse single radio voice call continuity according to claim 1, further comprising:
initiating, by a network, an access transfer procedure after handing over the user equipment to the packet switched domain network, and transmitting, by the user equipment, voice data with the peer user equipment by using the packet switched domain network and the second network element of the circuit switched domain.

6. A user equipment, comprising:
a processor;
a non-transitory computer readable medium connected to the processor and having stored thereon instructions that, when executed by the processor, cause the user equipment to:
before the user equipment hands over a voice service from a circuit switched domain network to a packet switched domain network, perform an internet protocol multimedia subsystem (IMS) registration so that in the process of handing over, by the user equipment, the voice service from the circuit switched domain network to the packet switched domain network, a forwarding channel is established between a first network element of the packet switched domain network and a second network element of the circuit switched domain network, wherein the forwarding channel is configured to forward voice service data between the user equipment and a peer user equipment after the user equipment accesses the packet switched domain network, and wherein the first network element is an access transfer gateway (ATCF/ATGW), and the second network element is a mobile switching center supporting a reverse single radio voice call continuity (SRVCC) service;
wherein the establishing a forwarding channel between a first network element of the packet switched domain network and a second network element of the circuit switched domain network uses preconfigured information about resources needed for the handing over and comprises controlling, by a mobility management entity (MME) using the preconfigured information about resources, the establishment of the forwarding channel between the first network element of the packet switched domain network and the second network element of the circuit switched domain network;
wherein the controlling the establishment of the forwarding channel comprises the second network element forwarding a handover request to the MME; and
wherein the preconfigured information about resources comprises at least context information that is pre-registered in the packet switched domain network by the user equipment, and the context information comprises at least information about a session transfer number for the reverse voice call continuity service (STN-SR).

7. The user equipment according to claim 6, wherein the instructions causing the user equipment to perform an IMS registration comprise instructions, that when executed by the processor, cause the user equipment to:
perform IMS registration in the packet switched domain network before the user equipment hands over the voice service from the circuit switched domain network to the packet switched domain network; and
a set up a session initiation protocol (SIP) session in the packet switched domain network before the user equipment hands over the voice service from the circuit switched domain network to the packet switched domain network.

8. The user equipment according to claim 7, wherein the instructions causing the user equipment to set up a SIP session comprise instructions, that when executed by the processor, cause the user equipment to:
send reverse single radio voice call continuity (rSRVCC) indicator information to a service centralization and continuity application server (SCC AS) in the SIP session setup process, wherein the rSRVCC indicator information is used to indicate to the SCC AS that the SIP session is used in a reverse voice call continuity service handover, and such that the SCC AS does not need to initiate a voice call to the peer user equipment, nor proactively trigger a procedure for releasing the preconfigured information about resources.

9. The user equipment according to claim 7, wherein the instructions causing the user equipment to perform IMS registration comprise instructions, that when executed by the processor, cause the user equipment to:
send indication information to a serving general packet radio service (GPRS) support node in the IMS registration procedure, wherein the indication information is used to indicate that the serving GPRS support node does not need to initiate a radio access bearer establishment process before the user equipment initiates the voice service handover from the circuit switched domain network to the packet switched domain network.

10. A mobility management entity (MME), comprising:
a receiving module, configured to receive a handover request, wherein the handover request is used to request a handover of a voice service of a user equipment from a circuit switched domain network to a packet switched domain network, and to receive a handover request from a second network element; and
a processor;
a non-transitory computer readable medium connected to the processor and having stored thereon instructions that, when executed by the processor, cause the MME to:
in the process of handing over, by the user equipment, the voice service from the circuit switched domain network to the packet switched domain network, control establishment of a forwarding channel between a first network element of the packet switched domain network and a second network element of the circuit switched domain network according to the handover request and by using preconfigured information about resources needed for the voice service handover and that is preconfigured in the packet switched domain network by the user equipment, wherein the forwarding channel is configured to forward voice service data between the user equipment and a peer user equipment after the user equipment accesses the packet switched domain network;

wherein the first network element is an access transfer gateway ATCF/ATGW, and the second network element is a mobile switching center supporting a reverse single radio voice call continuity (SRVCC) service; and wherein the preconfigured information about resources comprises at least context information that is pre-registered in the packet switched domain network by the user equipment, and the context information comprises at least information about a session transfer number for the reverse voice call continuity service (STN-SR).

11. The mobility management entity according to claim 10, wherein the instructions causing the MME to control establishment of a forwarding channel comprise instructions, that when executed by the processor, cause the MME to, if the user equipment supports dual transfer mode (DTM) or universal mobile telecommunications system (UMTS) mode:
  receive the handover request forwarded by a serving general packet radio service (GPRS) support node, wherein the handover request carries the context information pre-registered by a user equipment (UE); and
  forward the context information to the mobile switching center so that the mobile switching center addresses to a corresponding ATCF/ATGW according to STN-SR information in the context information, and establishes the forwarding channel with the corresponding ATCF/ATGW.

12. The mobility management entity according to claim 11, wherein the instructions causing the MME to control establishment of a forwarding channel comprise instructions, that when executed by the processor, cause the MME to, if the user equipment does not support DTM or UMTS mode:
  query, in a home subscriber server HSS and according to the received handover request forwarded by the mobile switching center, an identifier of a serving GPRS support node corresponding to the user equipment;
  according to the found identifier of the serving GPRS support node, acquire, from the specified serving GPRS support node, the context information pre-registered by the user equipment; and
  carry, in a handover response message, the STN-SR information in the context information, and return the handover response message to the mobile switching center so that the mobile switching center addresses to a corresponding ATCF/ATGW according to the STN-SR information and establish the forwarding channel with the corresponding ATCF/ATGW.

13. A system for processing reverse single radio voice call continuity, comprising a user equipment, a first network element, and a second network element, wherein:
  the user equipment is configured to: during or before handing over a voice service from a circuit switched domain network to a packet switched domain network, perform an IMS registration; and
  the first network element is located in the packet switched domain network, the second network element is located in the circuit switched domain network, and in the process of handing over, by the user equipment, the voice service from the circuit switched domain network to the packet switched domain network, a forwarding channel is established between the first network element of the packet switched domain network and the second network element of the circuit switched domain network by using preconfigured information about resources needed for the handing over, wherein the forwarding channel is configured to forward voice service data between the user equipment and a peer user equipment after the user equipment accesses the packet switched domain network, and wherein the first network element is an access transfer gateway ATCF/ATGW, and the second network element is a mobile switching center supporting a reverse single radio voice call continuity (SRVCC) service, wherein the establishing a forwarding channel between a first network element of the packet switched domain network and a second network element of the circuit switched domain network comprises controlling, by a mobility management entity MME using the preconfigured information about resources, establishment of the forwarding channel between the first network element of the packet switched domain network and the second network element of the circuit switched domain network;

wherein the controlling the establishment of the forwarding channel comprises, the second network element forwarding a handover request to the MME; and wherein the preconfigured information about resources comprises at least context information that is pre-registered in the packet switched domain network by the user equipment, and the context information comprises at least information about a session transfer number for the reverse voice call continuity service (STN-SR).

* * * * *